(12) United States Patent
Rahman et al.

(10) Patent No.: US 7,934,159 B1
(45) Date of Patent: Apr. 26, 2011

(54) MEDIA TIMELINE

(75) Inventors: Shafiq Ur Rahman, Redmond, WA (US); Sohail Baig Mohammed, Redmond, WA (US); Michael J. Novak, Redmond, WA (US); Adil Sherwani, Seattle, WA (US); Alexandre V. Grigorovitch, Redmond, WA (US); Xiqiang Zhi, Sammamish, WA (US); Kirt A. Debique, Seattle, WA (US); Stephen T. Leroux, Seattle, WA (US); Sumedh N. Barde, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1440 days.

(21) Appl. No.: 10/782,734

(22) Filed: Feb. 19, 2004

(51) Int. Cl.
G06F 3/00 (2006.01)
(52) U.S. Cl. .......................... 715/716; 715/855
(58) Field of Classification Search .................. 715/716, 715/201, 202, 203, 704, 717, 719, 721, 722, 715/723, 727, 730, 731, 732, 853, 854, 855
See application file for complete search history.

(56) References Cited

U.S. PATENT DOCUMENTS

| | | | |
|---|---|---|---|
| 5,140,437 A | 8/1992 | Yonemitsu et al. |
| 5,420,801 A | 5/1995 | Dockter et al. |
| 5,528,281 A | 6/1996 | Grady et al. |
| 5,539,886 A | 7/1996 | Aldred et al. |
| 5,546,584 A | 8/1996 | Lundin et al. |
| 5,574,934 A | 11/1996 | Mirashrafi et al. |
| 5,577,258 A | 11/1996 | Cruz et al. |
| 5,604,843 A | 2/1997 | Shaw et al. |
| 5,625,404 A | 4/1997 | Grady et al. |
| 5,675,752 A | 10/1997 | Scott et al. |
| 5,712,906 A | 1/1998 | Grady et al. |
| 5,764,965 A | 6/1998 | Poimboeuf et al. |
| 5,765,011 A | 6/1998 | Wilkinson et al. |
| 5,786,814 A | 7/1998 | Moran et al. |
| 5,802,283 A | 9/1998 | Grady et al. |
| 5,815,689 A | 9/1998 | Shaw et al. |
| 5,878,431 A | 3/1999 | Potterveld et al. |
| 5,886,274 A | 3/1999 | Jungleib |
| 5,887,139 A | 3/1999 | Madison, Jr. et al. |
| 5,892,767 A | 4/1999 | Bell et al. |
| 5,936,643 A | 8/1999 | Tindell et al. |
| 5,987,628 A | 11/1999 | Von Bokern et al. |
| 5,995,512 A | 11/1999 | Pogue, Jr. |

(Continued)

FOREIGN PATENT DOCUMENTS

EP          0784271 A2      7/1997

(Continued)

OTHER PUBLICATIONS

Agarwal, et al., "The Totem Multiple-Ring Ordering and Topology Maintenance Protocol", ACM, vol. 16, No. 2, 1998, pp. 93-132.

(Continued)

*Primary Examiner* — Weilun Lo
*Assistant Examiner* — Enrique W Iturralde
(74) *Attorney, Agent, or Firm* — Lee & Hayes, PLLC

(57) ABSTRACT

A media timeline is described. In an implementation, a method includes receiving a request from an application at an application programming interface (API) to interact with a plurality of media. Based on the request, a media timeline is generated. The media timeline is for exposure via the API to the application and includes a plurality of nodes. The media timeline defines a presentation of a first media referenced by a first node with respect to a second media referenced by a second node.

78 Claims, 18 Drawing Sheets

U.S. PATENT DOCUMENTS

| | | | |
|---|---|---|---|
| 5,996,015 | A | 11/1999 | Day et al. |
| 6,014,706 | A | 1/2000 | Cannon et al. |
| 6,038,625 | A | 3/2000 | Ogino et al. |
| 6,044,408 | A | 3/2000 | Engstrom et al. |
| 6,178,172 | B1 | 1/2001 | Rochberger |
| 6,185,612 | B1 | 2/2001 | Jensen et al. |
| 6,192,354 | B1 | 2/2001 | Bigus et al. |
| 6,209,041 | B1 | 3/2001 | Shaw et al. |
| 6,243,753 | B1 | 6/2001 | Machin et al. |
| 6,262,776 | B1 | 7/2001 | Griffits |
| 6,263,486 | B1 | 7/2001 | Boezeman et al. |
| 6,266,053 | B1 | 7/2001 | French et al. |
| 6,279,029 | B1 | 8/2001 | Sampat et al. |
| 6,308,216 | B1 | 10/2001 | Goldszmidt et al. |
| 6,317,131 | B2 | 11/2001 | Basso et al. |
| 6,321,252 | B1 | 11/2001 | Bhola et al. |
| 6,343,313 | B1 | 1/2002 | Salesky et al. |
| 6,347,079 | B1 | 2/2002 | Stephens et al. |
| 6,369,835 | B1 | 4/2002 | Lin |
| 6,385,201 | B1 | 5/2002 | Iwata |
| 6,389,467 | B1 | 5/2002 | Eyal |
| 6,430,526 | B1 | 8/2002 | Toll |
| 6,457,052 | B1 | 9/2002 | Markowitz et al. |
| 6,466,971 | B1 | 10/2002 | Humpleman et al. |
| 6,536,043 | B1 | 3/2003 | Guedalia |
| 6,539,163 | B1 * | 3/2003 | Sheasby et al. ............... 386/52 |
| 6,546,426 | B1 | 4/2003 | Post |
| 6,549,932 | B1 | 4/2003 | McNally et al. |
| 6,581,102 | B1 | 6/2003 | Amini et al. |
| 6,594,699 | B1 | 7/2003 | Sahai et al. |
| 6,594,773 | B1 | 7/2003 | Lisitsa et al. |
| 6,618,752 | B1 | 9/2003 | Moore et al. |
| 6,625,643 | B1 | 9/2003 | Colby et al. |
| 6,658,477 | B1 | 12/2003 | Lisitsa et al. |
| 6,684,331 | B1 | 1/2004 | Srivastava |
| 6,687,664 | B1 | 2/2004 | Sussman et al. |
| 6,691,312 | B1 | 2/2004 | Sen et al. |
| 6,694,368 | B1 | 2/2004 | An et al. |
| 6,711,171 | B1 | 3/2004 | Dobbins et al. |
| 6,725,274 | B1 | 4/2004 | Slik |
| 6,725,279 | B1 | 4/2004 | Richter et al. |
| 6,757,735 | B2 | 6/2004 | Apostolopulos et al. |
| 6,760,721 | B1 * | 7/2004 | Chasen et al. ......................... 1/1 |
| 6,802,019 | B1 | 10/2004 | Lauder |
| 6,810,526 | B1 | 10/2004 | Menard et al. |
| 6,823,225 | B1 | 11/2004 | Sass |
| 6,920,181 | B1 | 7/2005 | Porter |
| 6,957,430 | B2 | 10/2005 | Fant et al. |
| 6,975,752 | B2 | 12/2005 | Dixon et al. |
| 7,024,483 | B2 | 4/2006 | Dinker et al. |
| 7,035,858 | B2 | 4/2006 | Dinker et al. |
| 7,047,554 | B1 | 5/2006 | Lortz |
| 7,076,564 | B2 | 7/2006 | To et al. |
| 7,124,424 | B2 | 10/2006 | Gordon et al. |
| 7,139,925 | B2 | 11/2006 | Dinker et al. |
| 7,197,535 | B2 | 3/2007 | Salesky et al. |
| 7,206,854 | B2 | 4/2007 | Kauffman et al. |
| 7,240,325 | B2 | 7/2007 | Keller |
| 7,246,318 | B2 | 7/2007 | Debique et al. |
| 7,290,057 | B2 | 10/2007 | Saunders et al. |
| 7,299,485 | B2 | 11/2007 | Chaney et al. |
| 7,330,542 | B2 | 2/2008 | Kauhanen et al. |
| 7,415,537 | B1 | 8/2008 | Maes |
| 7,426,637 | B2 | 9/2008 | Risan et al. |
| 2001/0000962 | A1 | 5/2001 | Rajan |
| 2001/0024455 | A1 | 9/2001 | Thaler et al. |
| 2002/0051017 | A1 | 5/2002 | Wishoff |
| 2002/0085581 | A1 | 7/2002 | Hauck et al. |
| 2002/0099842 | A1 | 7/2002 | Jennings |
| 2002/0123997 | A1 | 9/2002 | Loy et al. |
| 2002/0158897 | A1 | 10/2002 | Besaw et al. |
| 2002/0174425 | A1 | 11/2002 | Markel et al. |
| 2002/0199031 | A1 | 12/2002 | Rust et al. |
| 2003/0028643 | A1 | 2/2003 | Jabri |
| 2003/0033424 | A1 | 2/2003 | Gould |
| 2003/0056029 | A1 | 3/2003 | Huang et al. |
| 2003/0093568 | A1 | 5/2003 | Deshpande |
| 2003/0095504 | A1 | 5/2003 | Ogier |
| 2003/0101253 | A1 | 5/2003 | Saito et al. |
| 2003/0123659 | A1 | 7/2003 | Forstrom et al. |
| 2003/0146915 | A1 | 8/2003 | Brook et al. |
| 2003/0149772 | A1 | 8/2003 | Hsu et al. |
| 2003/0158957 | A1 | 8/2003 | Abdolsalehi |
| 2003/0167356 | A1 * | 9/2003 | Smith et al. ................... 709/328 |
| 2003/0177292 | A1 | 9/2003 | Smirnov et al. |
| 2003/0215214 | A1 | 11/2003 | Ma |
| 2003/0231867 | A1 | 12/2003 | Gates et al. |
| 2003/0236892 | A1 | 12/2003 | Coulombe |
| 2003/0236906 | A1 | 12/2003 | Klernets et al. |
| 2004/0001106 | A1 * | 1/2004 | Deutscher et al. ............ 345/838 |
| 2004/0004631 | A1 | 1/2004 | Debique et al. |
| 2004/0031058 | A1 | 2/2004 | Reisman |
| 2004/0042413 | A1 | 3/2004 | Kawamura et al. |
| 2004/0073596 | A1 | 4/2004 | Kloninger et al. |
| 2004/0073912 | A1 | 4/2004 | Meza |
| 2004/0080504 | A1 | 4/2004 | Salesky et al. |
| 2004/0139157 | A1 | 7/2004 | Neely, III et al. |
| 2004/0177162 | A1 | 9/2004 | Wetzel et al. |
| 2004/0207723 | A1 | 10/2004 | Davis et al. |
| 2004/0208132 | A1 | 10/2004 | Neulist et al. |
| 2004/0220926 | A1 * | 11/2004 | Lamkin et al. ..................... 707/3 |
| 2004/0230659 | A1 | 11/2004 | Chase |
| 2004/0236945 | A1 | 11/2004 | Risan et al. |
| 2004/0267778 | A1 * | 12/2004 | Rudolph et al. .............. 707/100 |
| 2004/0267899 | A1 | 12/2004 | Rahman et al. |
| 2004/0267953 | A1 | 12/2004 | Dunbar et al. |
| 2004/0268224 | A1 | 12/2004 | Balkus et al. |
| 2004/0268357 | A1 | 12/2004 | Joy et al. |
| 2004/0268407 | A1 | 12/2004 | Sparrell et al. |
| 2005/0005025 | A1 | 1/2005 | Harville et al. |
| 2005/0018775 | A1 | 1/2005 | Subramanian et al. |
| 2005/0055517 | A1 | 3/2005 | Olds et al. |
| 2005/0066082 | A1 | 3/2005 | Forin et al. |
| 2005/0081158 | A1 | 4/2005 | Hwang |
| 2005/0125734 | A1 | 6/2005 | Mohammed et al. |
| 2005/0132168 | A1 | 6/2005 | Weiss et al. |
| 2005/0172309 | A1 | 8/2005 | Risan |
| 2005/0188311 | A1 | 8/2005 | Diesel et al. |
| 2005/0198189 | A1 | 9/2005 | Robinson et al. |
| 2005/0204289 | A1 | 9/2005 | Mohammed et al. |
| 2005/0226324 | A1 | 10/2005 | Ouyang et al. |
| 2005/0262254 | A1 | 11/2005 | Sherwani |
| 2007/0011321 | A1 | 1/2007 | Huntington et al. |
| 2008/0037957 | A1 | 2/2008 | Nallur et al. |
| 2008/0154407 | A1 | 6/2008 | Carson |

FOREIGN PATENT DOCUMENTS

| | | | |
|---|---|---|---|
| EP | 0814403 | A1 | 12/1997 |
| JP | 2002514797 | | 5/2002 |
| WO | WO9621189 | A1 | 7/1996 |
| WO | WO9957837 | A2 | 11/1999 |

OTHER PUBLICATIONS

Bao, et al., "Topology Management in Ad Hoc Networks", ACM, 2003, pp. 129-140.

Jaffe, et al., "Automatic Update of Replicated Topology Data Base", ACM, 1984, pp. 142-148.

Sullivan, et al., "Programming with the Java Media Framework", Sean C. Sullivan, Loren Winzeler, Jeanine Deagen, and Deanna Brown, 1998, pp. 99.

Chatterjee, et al., "Microsoft DirectShow: A New Media Architecture", SMPTE Journal, Dec. 1997, pp. 865-871.

Cline, et al., "DirectShow RTP Support for Adaptivity in Networked Multimedia Applications", IEEE, 1998, pp. 13-22.

Timothy K. Shih, "Participator Depenent Multimedia Presentation", Journal of Information Sciences, vol. 107, pp. 85-105, 1998.

Timothy K. Shih and Wen C. Pai, "A Stepwise Refinement Approach to Multimedia Presentation Designs", IEEE, pp. 117-122, 1997.

Arbab Ali Samejo et al., "Graphical User Interface Based Multimedia Web Suite in Windows Evironment", Mehran Unversity Research Journal of Engineering & Technology, vol. 20, No. 2, pp. 57-68, Apr. 2001.

Timothy Shih, et al., "A Knowledge Abstraction Approach for Multimedia Presentation", IEEE, pp. 528-532, 1997.

Sei-Hoon Lee and Chang-Jong Wang, "Open Multimedia/Hypermedia Application Development Environment", Inspec, 1996.

Chi-Ming Chung, et al., "A Control and Data Abstraction Approach for Multimedia Presentation", Journal of the Chinese Institute of Electrical Engineering, vol. 5, No. 3, pp. 265-276, 1998.

Robertson, Mark A.; Stevenson, Robert L.; "Temporal Resolution Enhancement in Compressed Video Sequences"; University of Notre Dame, Notre Dame, Indiana; Sep. 2001; pp. 1-11.

Girod, Bernd; Farber, Niko; "Feedback-Based Error control for Mobile Video Transmission"; Proceedings of the IEEE, v 87, n10, Oct. 1999; pp. 1707-1723.

Chien, Shao-Yi; Chen, Ching-Yeh; Huang, Yu-Wen; and Chen, Liang-Gee; "Multiple Sprites and Frame Skipping Techniques for Sprite Generation with High Subjuctive Quality and Fast Speed"; IEEE 2002; pp. 785-788.

Olson, Robert, et al., "Remote Rendering Using Vtk and Vic," website at http://www-unix.mcs.anl.gov/fl/publications/vis00-vicvtk.pdf, 2 pages.

Engel, Klaus et al, "Remote 3D Visualization Using Image-Streaming Techniques" website at: http://citeseer.nj.nec.com/394248.html, 4 pages.

Engel, K., et al., "Combining Local and Remote Visualization Techniques for Interactive Volume Rendering in Medical Applications" website at http://wwwvis.informatik.uni-stuttgart.de/eng/research/pub/pub2000/engel_vis00.pdf.

TGS website at http://www.tgs.com/pro_div/oiv_overview.htm, "Open Inventor from TGS4.0 Open Inventor Overview," printed Apr. 28, 2003, 4 pages.

Dunn, et al., "The Design and Implementation of JaDiSM", Nov. 13, 2007, pp. 38.

"How Terminal Services Works", retrieved on May 1, 2008 at <<http://technet2.microsoft.com/windowsserver/en/library/2cb5c8c9-cadc-44a9-bf39-856127f4c8271033.mspx>>, Microsoft TechNet, updated Mar. 28, 2003, pp. 1-15.

Maharaj, "A Primitive Window System Using GDI+ and C#", retrieved May 1, 2008 at <<http://web.archive.org/web/20020605051526/http://www.csharphelp.com/archives2/archive306.html>>, pp. 1-3.

Barth, et al., "Configuring Distributed Multimedia Applications Using CINEMA", retrieved on Jan. 19, 2008 at <<http://ieeexplore.ieee.org/xpls/absprintf.jsp?arnumber=557748 >> Published 2006, pp. 10.

Blome, et al., "Core Media Technology in Windows XP Empowers You to Create Custom Audio/Video Processing Components", retrieved on Sep. 22, 2009 at <<http://msdn.microsoft.com/en-us/magazine/cc301631.aspx>>, MSDN Magazine, 16 pages.

"DirectShow", retrieved on Sep. 22, 2009 at <<http://www.gdcl.co.uk/dshow.htm>>, Archived Oct. 17, 2002, 12 pages.

"EvCode.h", retrieved on Sep. 22, 2009 at <<http://www.Ielandnsmith.com/downloads/Microsoft/DirectX%209%20SDK/sdk/Include/evcode.h>>, Microsoft, 2001, pp. 1-6.

"GstEvent", retrieved on Sep. 22, 2009 at <<http://www.gstreamer.net/docs/gstreamer/gstreamer-bstevent.html>>, GStreamer Core Reference Manual, Archived Apr. 29, 2003, pp. 1-14.

"IFileSourceFilter Interface", retrieved on Sep. 22, 2009 at <<http://msdn.microsoft.com/en-us/library/dd389981(VS.85,printer).aspx>>, MSDN, Microsoft, Jul. 13, 2009, 4 pages.

Taymans, et al., "GStreamer Application Development Manual", retrieved on Sep. 22, 2009 at <<http://www.gstreamer.net/docs/gstreamer-manual.pdf>>, Archived Apr. 5, 2003, pp. i-iv and 1-84.

Thompson, "DirectShow for Media Playback In Windows", retrieved on Sep. 22, 2009 at <<http://www.flipcode.com/archives/DirectShow_For_Media_Playback_In_Windows-Part_I_Basics.shtml>>, Parts 1-3, Last Part Dated Sep. 13, 2000, 18 pages.

Escobar et al., "Flow Synchronization Protocol", IEEE/ACM Transactions on Networking, vol. 2, No. 2, Apr. 1994, pp. 111-121.

Kalman, "Analysis of Adaptive Media Playout for Stochastic Channel Models", Introduction Mar. 13, 2001, retrived at <<http://www.stanford.edu/class/ee368c/Projetcs/project10/node1.html>.

Manrique, "X Window System Architecture Overview HOWTO", May 22, 2001, retrived at <<http://tidp.org/HOWTP/XWindow-Overview-HOWTO/>>on Jun. 20, 2010.

Perry, "Absolute Beginner's Guide to Programming, Second Edition", Apr. 10, 2001, Que, Chapter 14, retrived at <<http://proquest.safaribooksonline.com/0789725290/ch14lev1sec4>>, pp. 1-21.

* cited by examiner

MEDIA TIMELINE

TECHNICAL FIELD

The present invention generally relates to media, and more particularly relates to a media timeline.

BACKGROUND

Users of computers, such as desktop PCs, set-top boxes, personal digital assistants (PDAs), and so on, have access to an ever increasing amount of media from an ever increasing variety of sources. For example, a user may interact with a desktop PC that executes a plurality of applications to provide media for output, such as home videos, songs, slideshow presentations, and so on. The user may also utilize a set-top box to receive traditional television programming that is broadcast to the set-top box over a broadcast network. Additionally, the set-top box may be configured as a personal video recorder (PVR) such that the user may store the broadcast content in memory on the set-top box for later playback. Further, the user may interact with a wireless phone that executes a plurality of applications such that the user may read and send email, play video games, view spreadsheets, and so forth.

Because of the wide variety of media sources and the wide variety of computers that may be utilized to provide and interact with media, traditional applications and computers were often configured to specifically address each particular type of media. For example, applications that were executed on a video-game console to output video-games were typically configured to provide an output of the applications to a television, and were not configured to provide the output that could be utilized by other computers and other devices. Therefore, presentation of content that was provided by the different media sources, such as computers and/or applications, may involve multiple applications and devices which may be both time and device intensive. Additionally, multiple applications that were executed on the same computer may be configured to specifically address the particular type of media provided by each respective application. For instance, a first audio playback application may be configured to output media configured as songs. A second audio playback application, however, may be configured to record and playback the recordings in an audio format that is not compatible with the first audio playback application, such as an audio-dictation format. Thus, even applications that are configured for execution on the same computer and the same type of media, e.g. audio, may provide media that is incompatible, one to another.

A timeline provides a way for a user to define a presentation of media. For example, a media player can play a list of songs, which is commonly referred to as a "playlist". Traditional timelines, however, were limited by the wide variety of media sources and the wide variety of computer configurations that may be utilized to provide and interact with media. When desiring the output of media from different applications, for instance, each type of media may require a different timeline which involves the use of different applications. This may result in an inefficient use of both hardware and software resources of the computer. Additionally, the different timelines may make it difficult to coordinate the outputs from the respective timelines, such as to output media from the separate timelines concurrently.

Further, the execution of large timelines may result in the inefficient use of software and/or hardware resources of the computer. When loading a large playlist of songs, for instance, each song in the playlist was loaded. Therefore, the initial loading of the playlist may consume a significant amount of hardware and/or software resources, thereby resulting in a delay in the loading and playing of songs in the playlist.

Accordingly, there is a continuing need to provide an improved timeline.

SUMMARY

A media timeline is described. The media timeline provides a technique for a user to define a presentation based on media. The media timeline may be utilized to express groupings and/or combinations of media and provide compositional metadata utilized by a timeline source to provide a presentation of the media described by the media timeline. The media timeline may be configured in a variety of ways to address a variety of considerations.

In an implementation, a method includes receiving a request from an application at an application programming interface (API) to interact with a plurality of media. Based on the request, a media timeline is generated. The media timeline is for exposure via the API to the application and includes a plurality of nodes. The media timeline defines a presentation of a first media referenced by a first node with respect to a second media referenced by a second node.

In an additional implementation, a method includes generating a media timeline by an application. The media timeline includes a plurality of nodes and defines a presentation of a first one of the media referenced by a first one of the nodes with respect to a second one of the media referenced by a second one of the nodes. The media timeline is passed to a timeline source for rendering.

In a further implementation, a method includes specifying an effect to be applied to one or more of a plurality of media when the media is rendered. A media timeline is generated that is configured for exposure via an API. The media timeline includes a plurality of nodes, two or more of which reference respective media. One or more of the nodes that reference the media include metadata that describes the effect.

In yet another implementation, a method includes rendering a first media item referenced by a first node in a media timeline. The media timeline is exposed via an API and has a plurality of nodes. During the rendering, one or more properties of a second node are changed. An event is initiated by an event generator located on the second node. The event describes the change and is for communication to a parent node of the second node.

In a still further implementation, an API includes a media timeline having a plurality of nodes. The API is for exposing the media timeline to one or more independent applications and the plurality of nodes are callable by the applications. Two or more of the nodes reference respective media. The plurality of nodes is arranged in a hierarchy to include a parent node and a child node. The child node is configured for initiating an event for communication to the parent node.

An API is described in an implementation that includes a media timeline having a plurality of nodes. The API is for exposing the media timeline to one or more independent applications and the plurality of nodes are callable by the applications. One or more of the nodes reference corresponding media, include metadata describing one or more properties for rendering the corresponding media, and include metadata specifying the node as read-only.

An API is described in another implementation, where the API exposes a media timeline to one or more independent applications. The media timeline includes a plurality of nodes that are callable by one of the applications. Each of the nodes includes metadata that describes the node. One or more of the nodes reference a corresponding media item. The plurality of nodes is arranged in a tree structure. The arrangement of the plurality of nodes, one to another, describes an order for rendering the plurality of nodes.

In another implementation, a system includes a plurality of media, a plurality of applications, and an infrastructure layer. Each of the applications is configured to request at least one of editing, encoding, and rendering of the plurality of media. The infrastructure layer provides an API for interaction by the plurality of applications with the plurality of media when any of the applications is executed. The infrastructure layer also exposes a media timeline, callable by the plurality of applications via the API upon an execution thereof, which defines a presentation of the plurality of media. In an implementation, a method includes rendering a first media item referenced by a first node in a media timeline. The media timeline is exposed via an application programming interface (API) and has a plurality of nodes. A call is received for a second node that references a second media item and the second node is created.

In yet another implementation, a computer includes a processor and memory. The memory is configured to maintain a plurality of media, a plurality of applications, and an infrastructure layer. Each of the applications is configured to request at least one of editing, encoding, and rendering of the plurality of media. The infrastructure layer is configured to provide an API for interaction by the plurality of applications with the plurality of media and expose a media timeline, callable by the plurality of applications via the API, which includes a plurality of nodes that define a presentation of the plurality of media. The media timeline specifies delayed creation of one or more said nodes when the media timeline is rendered.

BRIEF DESCRIPTION OF THE DRAWINGS

The same numbers are used throughout the disclosure and figures to reference like components and features.

DETAILED DESCRIPTION

Overview

Figure 1:
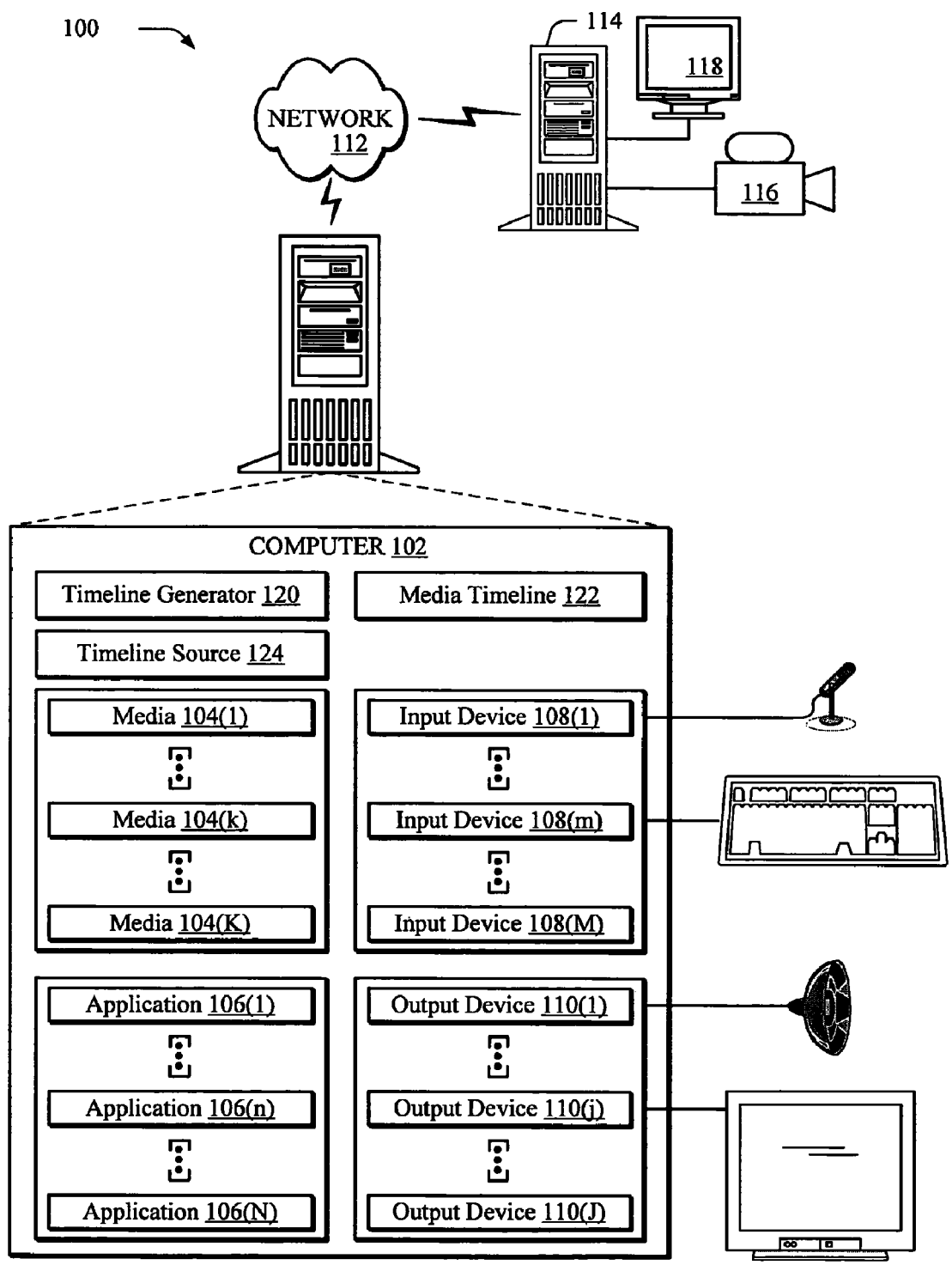
FIG. 1 is an illustration of an environment in an exemplary implementation in which a computer provides access to a plurality of media.

A media timeline is described. The media timeline provides a technique for a user to define a presentation based on media, such as already existing media (e.g., stored media such as video, songs, documents, and so on) and/or media that is output in "real-time" from a media source, such as streaming audio and/or video. The media timeline may be utilized to express groupings and/or combinations of media and provide compositional metadata utilized by a timeline source that executes, e.g. renders, the media timeline to provide a final presentation which includes the media described by the media timeline. The media timeline may be configured in a variety of ways to address a variety of considerations, exemplary implementations of which are described in the following examples.

In an implementation, the media timeline is configured to provide a single timeline model for different multimedia applications. The media timeline may be utilized as a basis for editing and outputting a variety of media. For example, the media timeline may be utilized in an editing system to overlay one video over another, clip an audio file, add effects to media, transition between media outputs, and so on. The media timeline may provide a single model to express presentation for different categories and types of multimedia applications. Categories of applications may include player, editor and encoding applications. Types of applications may be defined based on the type and formats of media the respective application processes, such as audio, video, and so on. By using a single timeline, interoperation scenarios may be provided by obtaining media from the variety of applications and combining the media for output. Further discussion of media timelines that are configured for use with multiple types and categories of applications may be found in relation to FIGS. 3-6.

In an additional implementation, the media timelines are configured for storing metadata. Nodes of a media timeline may include metadata that describe media referenced by the nodes, such as sources for the media, start and stop times for output of the media, effects to be applied to an output of the media, transitions between media outputs, and so on. The metadata may be utilized to render a presentation provided by the media timeline, as well as define a user interface for interacting with the described media. The media timeline may also be utilized to associate a plurality of metadata with respective media. Further discussion of media timelines and the metadata therein may be found in relation to FIGS. 7-11.

In another implementation, the media timeline is configured to support dynamic changes to the media timeline. For example, nodes of the media timeline may be dynamically modified, such as changed, added, and/or removed. Other nodes of the media timeline that are affected by these changes may be automatically updated by the media timeline. Thus, the media timeline provides an efficient mechanism for dynamically updating the presentation of the media. Further discussion of media timelines that provide for dynamic changes to the nodes of the media timeline may be found in relation to FIG. 14.

In a further implementation, the media timeline is configured for dynamic creation and/or loading of the media timeline. As previously discussed, a large media timeline, e.g. media timelines having a considerable number of nodes and/or significant amount of data, may result in inefficiencies when the media timeline is loaded. For example, a computer that loads the media timeline may utilize significant processing and memory resources even if all the nodes of the media timeline are not output at that time. Therefore, the media timeline may be configured for dynamic creation and/or loading such that the media timeline, when rendered, may intelligently delay loading and/or creation of the nodes of the media timeline. By configuring the media timeline for dynamic loading and creation, hardware and/or software resources of the computer may be efficiently utilized during startup of the computer and for loading the media timelines in general. Further discussion of media timelines that provide for dynamic creation and/or loading of the nodes of the media timeline may be found in relation to FIGS. 12-13.

Exemplary Environment

FIG. 1 is an illustration of an environment 100 in an exemplary implementation in which a computer 102 provides access to a plurality of media. The computer 102, as illustrated, is configured as a personal computer (PC). The computer 102 may also assume a variety of other configurations, such as a mobile station, an entertainment appliance, a set-top box communicatively coupled to a display device, a wireless phone, a video game console, a personal digital assistant (PDA), and so forth. Thus, the computer 102 may range from a full resource device with substantial memory and processor resources (e.g., PCs, television recorders equipped with hard disk) to a low-resource device with limited memory and/or processing resources (e.g., a traditional set-top box). An additional implementation of the computer 102 is described in relation to FIG. 24.

The computer 102 may obtain a variety of media from a variety of media sources. For example, the computer 102 may locally store a plurality of media 104(1), . . . , 104(k), . . . , 104(K). The plurality of media 104(1)-104(K) may include an assortment of audio and video content having various formats, such as WMV, WMA, MPEG 1, MPEG 2, MP3, and so on. Further, the media 104(1)-104(K) may be obtained from a variety of sources, such as from an input device, from execution of an application, and so on.

The computer 102, for instance, may include a plurality of applications 106(1), . . . , 106(n), . . . , 106(N). One or more of the plurality of applications 106(1)-106(N) may be executed to provide media, such as documents, spreadsheets, video, audio, and so on. Additionally, one or more of the plurality of applications 106(1)-106(N) may be configured to provide media interaction, such as encoding, editing, and/or playback of the media 104(1)-104(K).

The computer 102 may also include a plurality of input devices 108(1), . . . , 108(m), . . . , 108(M). One or more of the plurality of input devices 108(1)-108(M) may be configured to provide media for input to the computer 102. Input device 108(1), for instance, is illustrated as a microphone that is configured to provide an input of audio data, such as a voice of the user, a song at a concert, and so on. The plurality of input devices 108(1)-108(M) may also be configured for interaction by a user to provide inputs that control execution of the plurality of applications 106(1)-106(N). For example, input device 108(1) may be utilized to input voice commands from the user, such as to initiate execution of a particular one of the plurality of applications 106(1)-106(N), control execution of the plurality of applications 106(1)-106(N), and so forth. In another example, input device 108(m) is illustrated as a keyboard that is configured to provide inputs to control the computer 102, such as to adjust the settings of the computer 102.

Further, the computer 102 may include a plurality of output devices 110(1), . . . , 110(j), . . . , 110(J). The output devices 110(1)-110(J) may be configured to render media 104(1)-104(K) for output to the user. For instance, output device 110(1) is illustrated as a speaker for rendering audio data. Output device 110(j) is illustrated as a display device, such as a television, that is configured to render audio and/or video data. Thus, one or more of the plurality of media 104(1)-104(K) may be provided by the input devices 108(1)-108(M) and stored locally by the computer 102. Although the plurality of input and output devices 108(1)-108(M), 110(1)-110(J) are illustrated separately, one or more of the input and output devices 108(1)-108(M), 110(1)-110(J) may be combined into a single device, such as a television having buttons for input, a display device, and a speaker.

The computer 102 may also be configured to communicate over a network 112 to obtain media that is available remotely over the network 112. The network 112 is illustrated as the Internet, and may include a variety of other networks, such as an intranet, a wired or wireless telephone network, a broadcast network, and other wide area networks. A remote computer 114 is communicatively coupled to the network 112 such that the remote computer 114 may provide media to the computer 102. For example, the remote computer 114 may include one or more applications and a video camera 116 that provides media, such as home movies. The remote computer 114 may also include an output device to output media, such as the display device 118 as illustrated. The media obtained by the computer 102 from the remote computer 114 over the network 112 may be stored locally with the media 104(1)-104(K). In other words, media 104(1)-104(K) may include locally stored copies of media obtained from the remote computer 114 over the network 112.

Thus, the computer 102 may obtain and store a plurality of media 104(1)-104(K) that may be provided both locally (e.g., through execution of the plurality of applications 106(1)-106(N) and/or use of the plurality of input device 108(1)-108(M)), and remotely from the remote computer 114 (e.g., through execution of application and/or use of input devices). Although the plurality of media 104(1)-104(K) has been described as stored on the computer 102, the media 104(1)-104(K) may also be provided in "real-time". For example, audio data may be streamed from the input device 108(1), which is illustrated as a microphone, without storing the audio data.

The computer 102 includes a timeline generator 120 that, when executed on the computer 102, generates a media timeline 122. For example, the timeline generator 120 may be configured as an application that exposes one or more software components that may be used to generate the media timeline 122, such as through a user interface by a user. As previously described, the media timeline 122 provides a technique for a user to define a presentation of stored and/or real-time media from the plurality of media sources. For example, the media timeline 122 may describe a collection of media that was obtained from the input devices 108(1)-108(M), the applications 106(1)-106(N), and/or the remote computer 114. The user may utilize one or more of the input devices 108(1)-108(M) to interact with the timeline generator 120 to define groupings and/or combinations of the media 104(1)-104(K). The user may also define an order and effects for presentation of the media 104(1)-104(K). A timeline source 124 may then be executed on the computer 102 to render the media timeline 122. The media timeline 122, when rendered, provides the expressed groupings and/or combinations of the media 104(1)-104(K) for rendering by one or more of the plurality of output devices 110(1)-110(J). Additionally, the timeline generator 120 may also programmatically generate the media timeline 122 as is described in greater detail in the following implementation.

Figure 2:
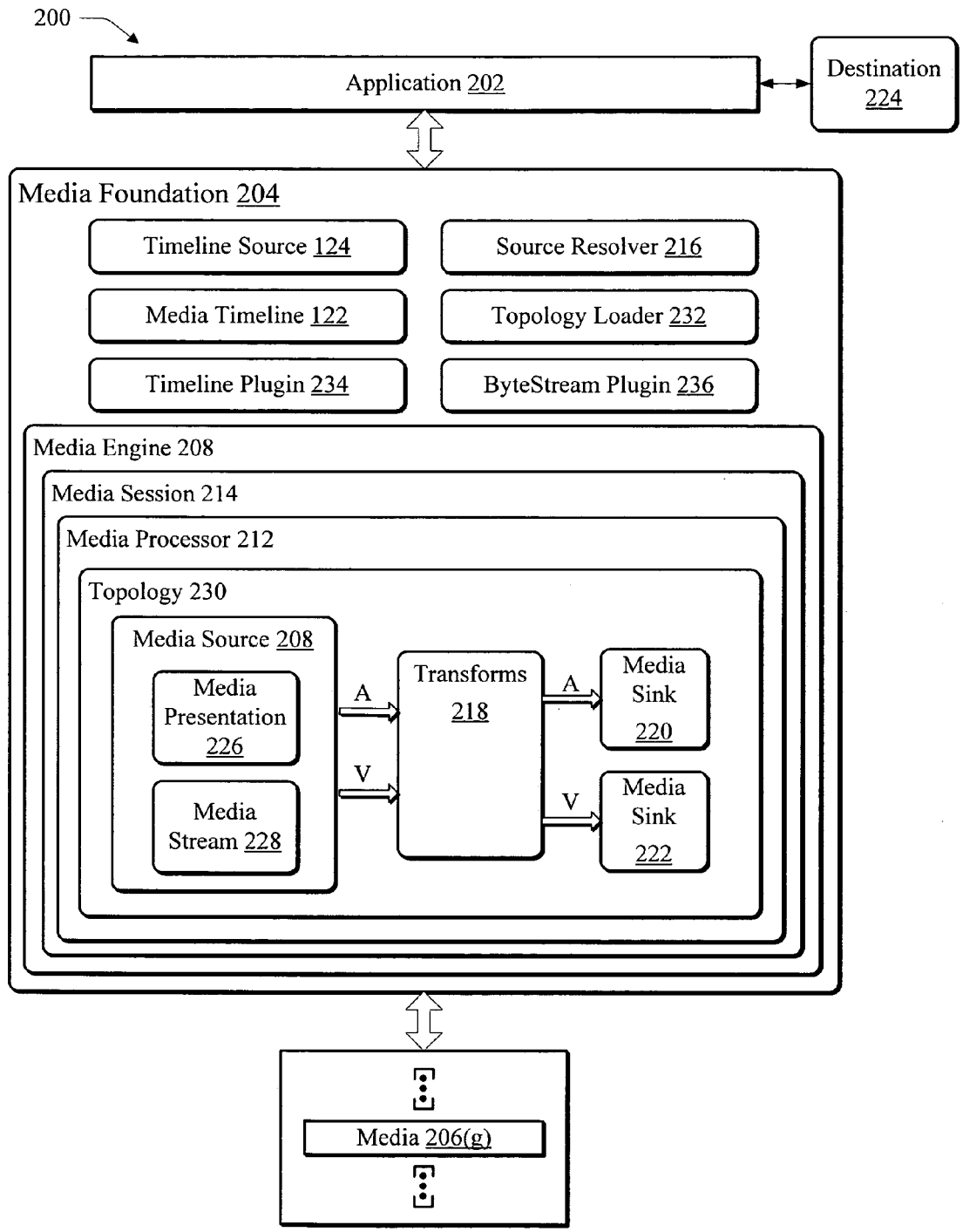
FIG. 2 is a high level block diagram of a system in an exemplary implementation in which the system, implemented in software, includes an application that interacts with a media foundation to control presentation of a plurality of media.

FIG. 2 is a high level block diagram of a system 200 in an exemplary implementation in which the system 200, implemented in software, includes an application 202 that interacts with a media foundation 204 to control presentation of a plurality of media 206(g), where "g" can be any number from one to "G". The media foundation 204 may be included as a part of an operating system to provide playback of the media 206(g) such that applications that interact with the operating system may control playback of the media 206(g) without "knowing" the particular details of the media formats. The media 206(g) may be provided from a variety of sources, such as from the media 104(1)-104(K) of FIG. 1, through execution of the applications 106(1)-106(N), use of the input devices 108(1)-108(M), output devices 110(1)-110(J), and so on.

The application 202, which may be the same as or different from applications 106(1)-106(N) of FIG. 1, interacts with a media engine 208 to control the media 104(1)-104(K). In at least some embodiments, the media engine 208 serves as a central focal point of the application 202 that desires to somehow participate in a presentation. A presentation, as used in this document, refers to or describes the handling of media. In the illustrated and described embodiment, a presentation is used to describe the format of the data on which the media engine 208 is to perform an operation. Thus, a presentation can result in visually and/or audibly presenting media, such as a multimedia presentation in which both audio and accompanying video is presented to user within a window rendered on a display device, such as output device 110(j) of FIG. 1 that is illustrated as a display device that may be associated with a desk-top PC. A presentation can also result in writing media content to a computer-readable medium such as a disk file. Thus, a presentation is not limited to scenarios in which multimedia content is rendered on a computer. In some embodiments, operations such as decoding, encoding and various transforms (such as transitions, effects and the like), can take place as a result of a presentation.

In an embodiment, the media foundation 204 exposes one or more application program interfaces that can be called by the application 202 to interact with the media 206(g). For example, the media foundation 204 may be thought of as existing at an "infrastructure" level of software that is executed on the computer 102 of FIG. 1. In other words, the media foundation 204 is a software layer used by the application 202 to interact with the media 206(g). The media foundation 204 may be utilized to control a number of aspects of the media 206(g), such as output, rendering, storage, and so on. Thus, the media foundation 204 may be utilized such that each application 202 does not have to implement separate code for each type of media 206(g) that may be used in the system 200. In this way, the media foundation 204 provides a set of reusable software components to do media specific tasks.

The media foundation 202 may utilize several components among which include the media timeline 122, the timeline source 124, a media source 210, a media processor 212, a media session 214, the media engine 208, a source resolver 216, one or more transforms 218, one or more media sinks 220, 222, and so on. One advantage of various illustrated and described embodiments is that the system 200 is a pluggable model in the sense that a variety of different kinds of components can be utilized in connection with the systems described herein. Also included as a part of system 200 is a destination 224, which is discussed in more detail below. In at least one embodiment, however, the destination 224 is an object that defines where a presentation is to be presented (e.g. a window, disk file, and the like) and what happens to the presentation. That is, the destination may correspond to one or more of the media sinks 220, 222 into which data flows.

The media timeline 122 employs a timeline object model which provides a way for a user to define a presentation based on media that is rendered by the timeline source 124. The media timeline 122 may range from a sequential list of media files to more complex forms. For example, the media timeline 122 may employ file structures, such as SMIL and AAF, to express media playback experiences that include transitions between media, effects, and so on. The application 202, for instance, may be configured as a media player that can play a list of songs, which is commonly referred to as a playlist. As another example, in an editing system a user may overlay one video over the other, clip a media, add effect to the media and so forth. Such groupings or combinations of media may be expressed using the media timeline 122. Further discussion of the media timeline 122 is found in relation to FIG. 3.

The media source 210 is utilized to abstract a provider of media. The media source 210, for instance, may be configured to read a particular type of media from a particular source. For example, one type of media source might capture video from the outside world (a camera), and another might capture audio (a microphone). Alternately or additionally, the media source 210 may read a compressed data stream from disk and separate the data stream into its compressed video and compressed audio components. Yet another media source 210 might obtain data from the network 112 of FIG. 1. Thus, the media source 210 may be utilized to provide a consistent interface to acquire media.

The media source 210 provides one or more media presentation 226 objects (media presentation). The media presentation 226 abstracts a description of a related set of media streams. For example, the media presentation 226 may provide a paired audio and video stream for a movie. Additionally, the media presentation 226 may describe the configuration of the media source 210 at a given point in time. The media presentation 226, for instance, may contain information about the media source 210 including descriptions of the available streams of the media source 210 and their media types, e.g. audio, video, MPEG, and so on.

The media source 210 may also provide a media stream 228 object (media stream) which may represent a single stream from the media source 210 which can be accessed by the application 202, i.e. exposed to the application 202. The media stream 228 thus allows the application 202 to retrieve samples of the media 206(g). In an implementation, the media stream 228 is configured to provide a single media type. A media source can provide more than one media stream. For example, a wmv file can have both audio and video in the same file. The media source for this file will therefore provide two streams, one for audio and the other for video.

In the media foundation 204, therefore, the media source 210 is defined as a software component which outputs samples for a presentation. The timeline source 124 interprets the media timeline 122, but at the same time, may also act in a manner similar to the media source 210. For example, the timeline source 210 may be utilized to hide the intricacies of rendering the media timeline 122 to provide media described by the media timeline 122 from other components of the media foundation 204.

The media processor 212 manages data flow in a topology 230. The topology 230 defines how data flows through various components for a given presentation. A "full" topology includes each of the components, e.g. software modules, used to manipulate the data such that the data flows with the correct format conversions between different components. When a topology is created, the user might choose to create it partially. This partial topology is not sufficient, by itself, to provide a final presentation. Therefore, a component called the topology loader 232 may take the partial topology and convert it into a full topology by adding the appropriate data conversion transforms between the components in the partial topology.

In the topology 230, for example, data generally originates at the media source 210, flows through one or more transforms 218, and proceeds into one or more media sinks 220, 222. Transforms 218 can include any suitable data handling components that are typically used in presentations. Such components can include those that uncompress compressed data and/or operate on data in some way, such as by imparting an effect to the data, as will be appreciated by the skilled artisan. For example, for video data, transforms can include those that affect brightness, color conversion, and resizing. For audio data, transforms can include those that affect reverberation and re-sampling. Additionally, decoding and encoding can be considered as transforms.

Media sinks 220, 222 are typically associated with a particular type of media content. Thus, audio content might have an associated audio sink such as an audio renderer. Likewise, video content might have an associated video sink such as a video renderer. Additional media sinks can send data to such things as computer-readable media, e.g. a disk file and the like, stream the data over the network, such as broadcasting a radio program, and so on.

The media session 214 is a component which may schedule multiple presentations. Therefore, the media processor 212 may be used to drive a given presentation, and the media session 214 utilized to schedule multiple presentations. The media session 214, for instance, may change topologies that are rendered by the media processor 212. For example, the media session 214 may change from a first topology that is rendered on the media processor 212 to a second topology such that there is no gap between the renderings of samples from the consecutive presentations that are described by the respective topologies. Thus, the media session 214 may provide a seamless user experience as the playback of the media moves from one presentation to another.

The source resolver 216 component may be utilized to create a media source 210 from URLs and/or byte stream objects. The source resolver 216 may provide both synchronous and asynchronous ways of creating the media source 210 without requiring prior knowledge about the form of data produced by the specified resource.

In at least one embodiment, the media foundation 204 is utilized to abstract away the specific details of the existence of and interactions between various components of the media foundation 204. That is, in some embodiments, the components that are seen to reside inside the media foundation 204 are not visible, in a programmatic sense, to the application 202. This permits the media foundation 202 to execute so-called "black box" sessions. For example, the media engine 208 can interact with the media session 214 by providing the media session certain data, such as information associated with the media (e.g. a URL) and the destination 224, and can forward the application's 202 commands (e.g. open, start, stop and the like) to the media session 214. The media session 214 then takes the provided information and creates an appropriate presentation using the appropriate destination.

The media foundation 204 may also include a timeline plugin 234. The timeline plugin 234 may be utilized such that different media timeline file formats may be "plugged-in" to the media foundation 204. For example, a bytestream plugin 236 may be written for a format in question and registered with the media foundation 204. The source resolver 216 may then invoke a bytestream plugin 236 when a file of that type is opened. In turn the bytestream plugin 236 can parse the file, create a media timeline 122 representing the presentation described in the file, and create a timeline source 124 for it. In general, the bytestream plugin 236 is responsible for reading the raw bytestream and creating a media source 208 for it. In an implementation, the remaining components of media foundation 204 are not made aware that the media source created in this instance is a timeline source 124. Therefore, the timeline source 124 is treated like any other media source 208. In an implementation, a bytestream plugin 236 that can parse a media timeline 122 and create a timeline source 124 is referred to as a timeline plugin, which is described in greater detail in relation to FIG. 23.

The timeline plugin 234 may also provide an interface such that the application 202 may interact with the timeline plugin directly, such as to load and save the media timeline 122 from or to a file. For example, the timeline plugin 234 may be created and then called to initiate a load function to provide a bytestream. The timeline plugin 234 may then parse the file and create a root node and any additional nodes to create the media timeline 122, which will be described in greater detail in relation to FIG. 3. The timeline plugin 234 may also be used to persist the media timeline 122 to different formats. For example, the application 202 may create the media timeline 122 programmatically. In other words, the application may act as the timeline generator 120 of FIG. 1. The application 202 may then create a timeline plugin for ASX files, and ask the timeline plugin to save the media timeline 122 in the ASX format. In another example, a user can open an m3u file, i.e. a playlist file format for specifying multiple MP3 files, get the media timeline 122 from it, and then ask the timeline plugin to save the media timeline 122 in the ASX format. In this example, the timeline plugin acts as the timeline generator 120. Thus, the media foundation 204 may expose a plurality of software components that provide media functionality over an application programming interface for use by the application 202.

Figure 3:
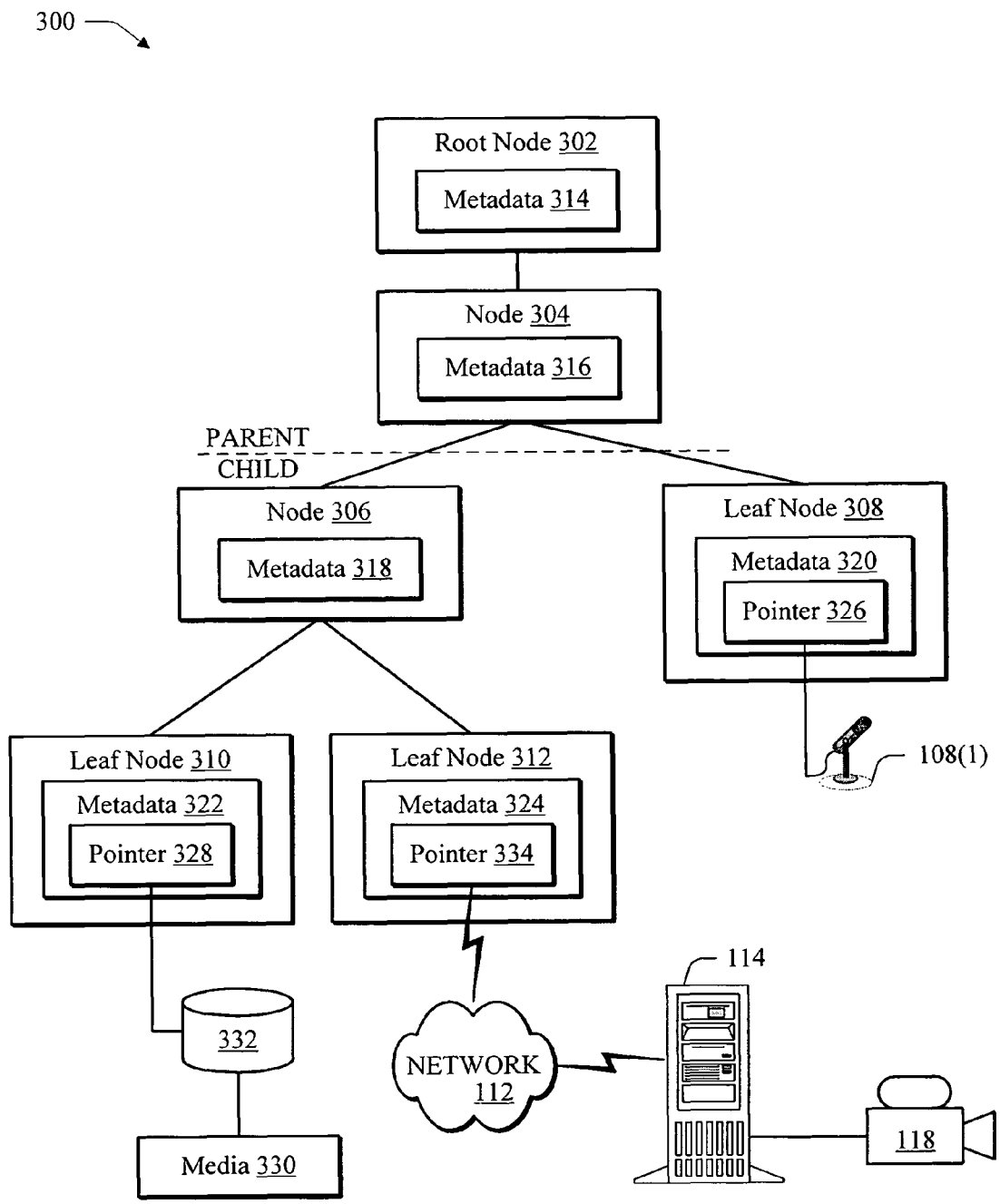
FIG. 3 is an illustration of an exemplary implementation in which a media timeline is shown as a tree that includes a plurality of nodes that provide for an output of media for a presentation.

FIG. 3 is an illustration of an exemplary implementation in which a media timeline 300 is shown as a tree that includes a plurality of nodes that describe an output of media for a presentation. The media timeline 300, which may or may not correspond to the media timeline 122 of FIGS. 1 and 2, is structured as a tree that includes a plurality of nodes 302-312. Each of the plurality of nodes 302-312 includes respective metadata 314-322 that describes various attributes and behaviors for the node and/or "children" of that particular node. For example, node 304 and node 306 are arranged, respectively, as a "parent" and "child". Node 304 includes metadata 316 that describes behaviors and attributes of that node 304. The metadata 316 may also describe each of the "child" nodes 306, 308, such as a rendering order of the nodes 306, 308.

In an implementation, the media timeline 300 is not executable by itself to make decisions about a user interface (UI), playback or editing. Instead, the metadata 314-324 on the media timeline 300 is interpreted by a software and/or hardware component that renders the media timeline 300, such as the timeline source 124 of FIG. 2. Additionally, applications that are utilized during rendering of the media timeline 122 may obtain relevant metadata for that particular application. For example, the application 202 of FIG. 2 may be configured as a playback engine that is only interested in the times at which each media referenced in the media timeline is to be started. On the other hand, another application, such as a media player, may be interested in just displaying the titles of the songs, which are stored as metadata on each node. In this way, the metadata may be utilized at the same time by one or more applications that utilize an output of the media.

The nodes 302-312, as positioned on the media timeline 300, describe a basic layout of the media timeline 300. This layout may be utilized for displaying a timeline structure in a user interface, utilized by the timeline source 124 of FIG. 2 to order rendering of the nodes, and so forth. For instance, various types of nodes 302-312 may be provided such that a desired layout is achieved. The node type indicates how the children of that node are interpreted, such as a root node 302 and leaf nodes 308-312. The root node 302 specifies a starting point for rendering the metadata timeline 300 and includes metadata 314 that describes how rendering is to be initiated.

In the illustrated implementation of FIG. 3, the leaf nodes 308, 310, 312 of the media timeline 122 directly map to media. For example, the leaf nodes 308, 310, 312 may have respective metadata 320, 322, 324 that describes how to retrieve the media that each of the leaf nodes 308-312 represent. A leaf node may specify a path for an audio and/or video file, point to a component which generates video frames programmatically during rendering of the media timeline 300, and so on. Leaf node 308, for instance, includes metadata 320 having a pointer 326 that maps to input device 108(1) that is configured as a microphone. Leaf node 310 includes metadata 322 having a pointer 328 that maps to an address of the media 330 in a storage device 332 that is included locally on the computer 102 of FIG. 1. Leaf node 312 includes metadata 324 having a pointer 334 that maps to a network address of the remote computer 114 on the network 112. The remote computer 114 includes the video camera 116 to provide media over the network 112 to the computer 102 of FIG. 1. Thus, in this implementation, the timeline 300 does not include the actual media, but rather references the media by using pointers 326, 328, 334 that describe where and/or how to locate the referenced media.

Figure 4:
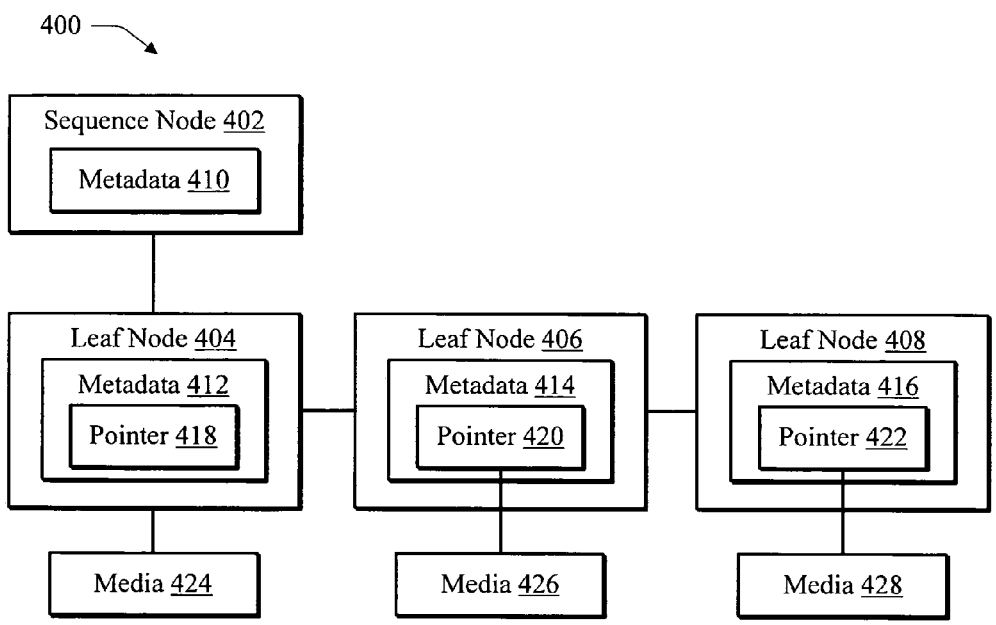
FIG. 4 is an illustration of an exemplary implementation showing a sequence node and a plurality of leaf nodes that are children of the sequence node.
Figure 5:
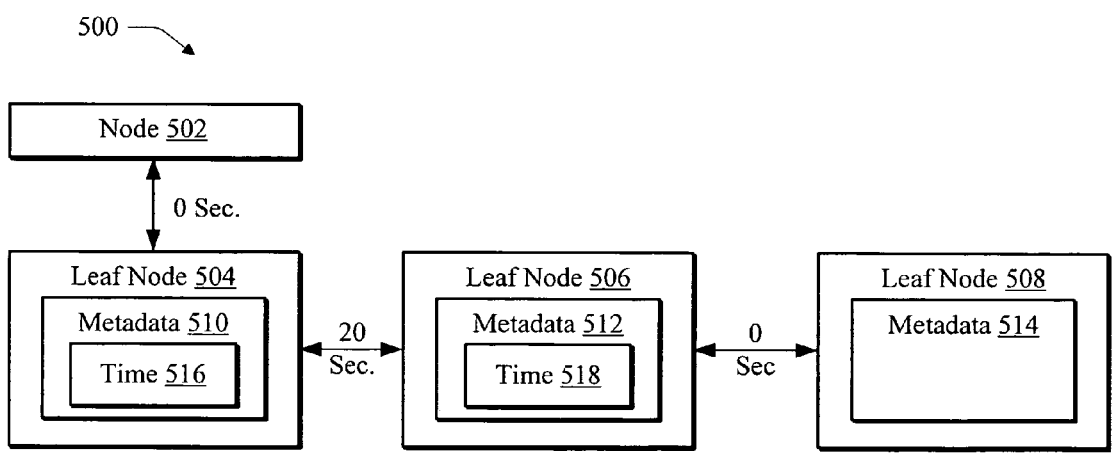
FIG. 5 is an illustration of an exemplary implementation in which a sequence node and a plurality of nodes that are children of the sequence node include metadata that specifies timing information for execution of the respective plurality of nodes.
Figure 6:
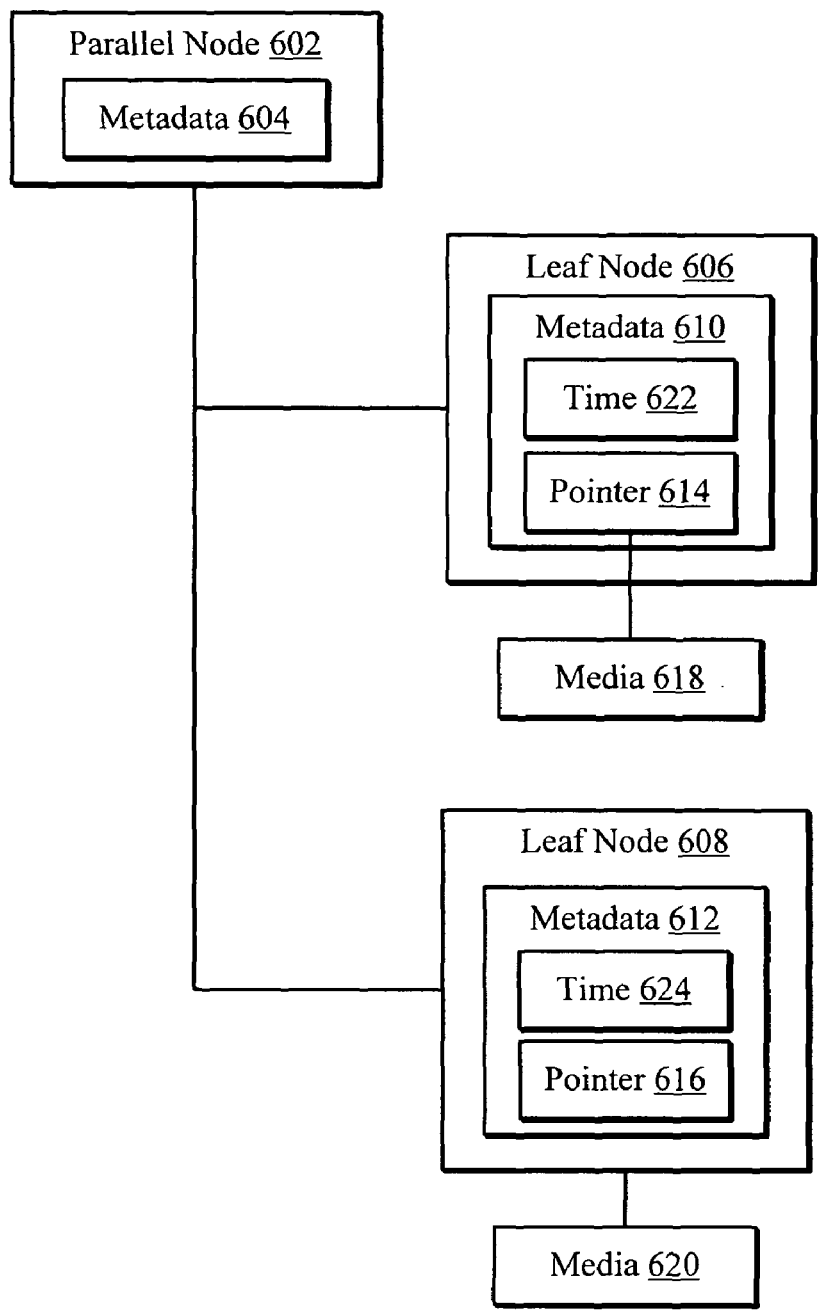
FIG. 6 is an illustration of an exemplary implementation showing a parallel node and a plurality of leaf nodes that are children of the parallel node.

Nodes 304, 306 may also describe additional nodes of the media timeline 300. For example, node 304 may be utilized to describe the order of execution for nodes 306, 308. In other words, node 304 acts as a "junction-type" node to provide ordering and further description of its "children". There are a variety of junction-type nodes that may be utilized in the media timeline 300, such as a sequence node and a parallel node. FIGS. 4-6 describe exemplary semantics behind the sequential and parallel nodes.

FIG. 4 is an illustration of an exemplary implementation 400 in which a sequence node 402 and a plurality of leaf nodes 404, 406, 408 that are children of the sequence node 402 are shown. The children of the sequence node 402 are rendered one after the other. Additionally, the sequence node 402 may include metadata 410 that describes a rendering order of the plurality of leaf nodes 404-408. As illustrated, leaf node 404 is rendered first, followed by leaf node 406, which is followed by leaf node 408. Each leaf node 404-408 includes respective metadata 412, 414, 416 having respective pointers 418, 420, 422 to respective media 424, 426, 428. Thus, the sequence node 402 may represent the functionality of a linear playlist of files.

Although the child nodes of the sequence node 402 are configured as leaf nodes in this implementation, child nodes of the sequence node 402 may represent any other type of node. For example, child nodes may be utilized to provide a complex tree structure as shown in FIG. 3. Node 306 of FIG. 3, for instance, is the child of another junction-type node, i.e. node 304.

FIG. 5 is an illustration of an exemplary implementation 500 in which a sequence node 502 and a plurality of nodes 504, 506, that are children of the sequence node 502 include metadata that specifies timing information for execution of the respective plurality of nodes 504, 506. Each of the plurality of leaf nodes 504, 506, 508 includes respective metadata 510, 512, 514 as previously described. The metadata 510 of leaf node 504, which is a first child node of the sequence specified by node 502, includes time 516 data that specifies a start time relative to the start time on the parent node, i.e. node 502. The other child nodes, i.e. leaf nodes 506, 508 have their start times specified relative to the previous node in the sequence. For example, suppose output of media corresponding to the leaf node 504 is desired when the node 502 is first executed. Additionally, when output of the media referenced by leaf node 504 ends, the media corresponding to leaf node 506 is to be output after a gap to 20 seconds. Therefore, the time 516 specified by the metadata 510 of leaf node 504 is "zero" and the time 518 specified by the metadata 512 of leaf node 506 is "20 seconds".

Specifying times 516, 518 relative to the previous node allows for defining a sequence where duration output of media referenced by each child node in the sequence is not known. When the start time for a node is not specified, as shown by the metadata 514 of leaf node 508, it means that the node, i.e. leaf node 508, should be immediately start output after the previous node, i.e. leaf node 506, has finished output.

FIG. 6 is an illustration of an exemplary implementation 600 in which a parallel node 602 includes metadata 604 specifying a plurality of leaf nodes 606, 608 that are children of the parallel node 602 are shown. In the previous implementations that were described in relation to FIGS. 4 and 5, sequence nodes were discussed in which nodes that are children of the sequence node were rendered, one after another. To provide rendering of nodes at the same time, the parallel node 602 may be employed.

The children of the parallel node 602 may be rendered simultaneously. For example, leaf node 606 and leaf node 608 are children of parallel node 602. Each of the leaf nodes 606, 608 includes respective metadata 610, 612 having respective pointers 614, 616 to respective media 618, 620. Each of the leaf nodes 606, 608 includes a respective time 622, 624 included in the respective metadata 610, 612 that specifies when the respective leaf nodes 606, 608 are to be rendered. The times 622, 624 on the leaf nodes 606, 608 are relative to the parallel node 602, i.e. the parent node. Each of the child nodes can represent any other type of node and combinations of nodes, providing for a complex tree structure with combined functionality. For example, a "junction" type node may also reference media, and so forth. Although metadata including time data has been described, a variety of metadata may be included on nodes of the media timeline, an example of which is described in the following implementation.

Media Timelines that are Configured to Store Metadata

Figure 7:
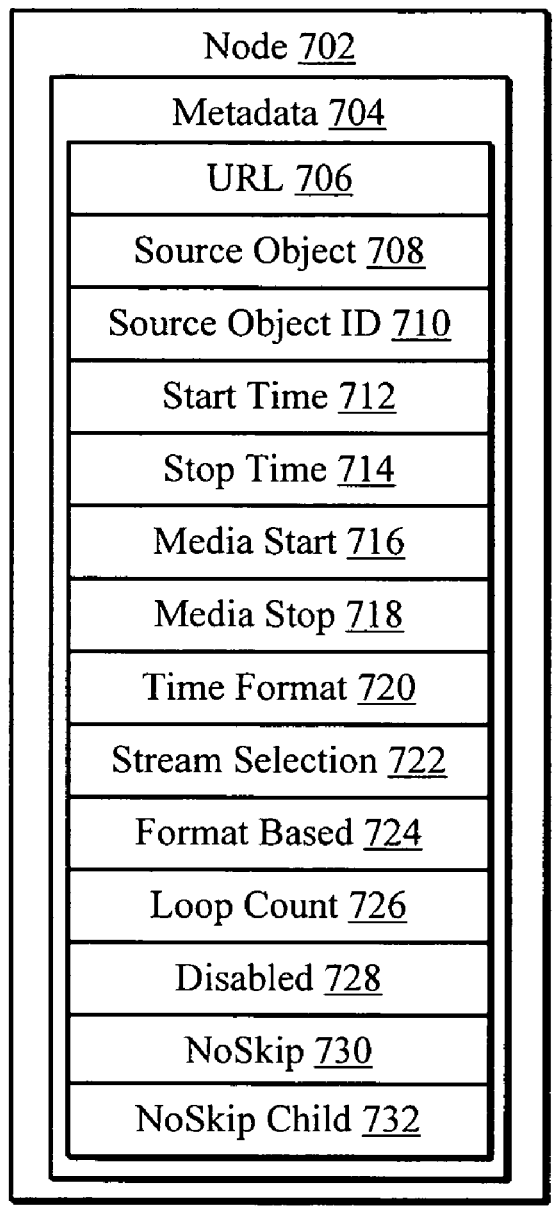
FIG. 7 is an illustration of a node in exemplary implementation showing examples of metadata that may be included in the node.

FIG. 7 is an illustration of an exemplary implementation 700 showing examples of metadata that may be included in a node. In this implementation 700, each node in the media timeline is capable of storing metadata. Metadata may be utilized to describe properties of the node, such as media referenced by the node, rendering order for children of the node, specify a node type (e.g., sequential, parallel, root, and leaf), and so forth. The media timeline may treat any property being set on the node as metadata. For example, properties like start and stop times of the node, the URL for the media of the node, and so on are stored as metadata.

Additionally, authors of the media timeline may add custom metadata to the nodes. For example, the application 202 of FIG. 2 may be configured as a media player that stores album art for a CD track on the leaf node corresponding to that particular track. Standard properties and custom properties may be treated in the same manner so that there is no ambiguity when obtaining the metadata. Therefore, even if each property described by the metadata is provided by a different respective interface or source, the media timeline provides a mechanism to track the various properties.

Further, properties from different sources may be aggregated by treating the metadata in a consistent manner by the media timeline. For example, a playlist may include a plurality of tracks, each having a different composer. Each track of the playlist may be represented as a leaf node that is a child of a sequence node. The media timeline may aggregate the metadata such that a query to the sequence node, i.e. the parent node, returns the composers of all the media in the playlist from each leaf node, i.e. the child nodes. Consistent use of metadata may also provide sorting for each of the nodes. For example, if all properties on a node are treated as metadata, an application may sort the nodes based on any properties defined in the metadata in a consistent fashion.

A node 702 may include a variety of metadata 704, such as properties that define playback behaviors and attributes for the nodes. Examples of properties defined by the metadata 704 are described as follows.

URL 706

This property holds the URL for the media. In the case of a file, the URL 706 property may provide the path to the file. For example, the URL 706 property may provide a path to a storage device to locate particular media.

SourceObject 708, SourceObjectID 710

In some instances, the source for the media cannot be specified by a URL. For example, a media source for outputting black color frames may not be locatable by a URL. The SourceObject 708 and SourceObjectID 710 properties allow the user to specify the media source by specifying an object which can resolve to a media source, such as the media source itself or some other object. When a media source is specified as a source object, SourceObject 708 property provides a pointer to the media source and the SourceObjectID 710 property specifies a globally unique identifier of the source object. In an implementation, the SourceObject 708 property takes precedence over the URL 706 property in case both are defined.

Start Time 712, Stop Time 714

The start and stop times 712, 714 define at what time the node 702 is to be started and stopped with respect to the other nodes. For nodes that are children of a parallel node, for instance, the start and stop times 712, 714 are defined relative to the parallel node, i.e. the parent of the children. For nodes that are children of a sequence node, the first child node includes start and stop times 712, 714 that are defined relative to the sequence node. The remaining nodes each include start and stop times that are defined relative to a previous sibling. In an implementation, it is not necessary to define the start and stop times 712, 714 for the node 702. For example, when the start and stop times 712, 714 are not specified, the start time 712 is assumed to be zero and the node 702 is stopped when the rendering of the media referenced by the node 702 is completed.

Media Start 716, Media Stop 718

Each node in a media timeline may reference media. The media start 716 and media stop 718 properties define a portion of the media that is to be output. For example, the node 702 may represent media from a file having a total length of 50 seconds. The user, however, might want to output only a portion of the media from 20 to 30 seconds in the file. To do this, the media start 716 may be specified as 20 seconds and the media stop 718 may be specified as 30 seconds.

The duration of the time period defined by the start time 712 and stop time 714 of the node, i.e. "nodetime" need not equal the duration of the time period defined by the media start 716 and the media stop 718, i.e. "mediatime". For example, when the specified nodetime is greater than the mediatime, output of the media referenced by the node 702 may be slowed. Therefore, the portion of the media defined by the media start 716 and the media stop 718 may be output for the duration of the time period defined by the start and stop times 712, 714 of the node, i.e. "nodetime". In other words, output of the portion may be extended such that the nodetime is equal to the mediatime. In another example, a last frame of the media may be frozen until the nodetime elapses, a video frame can be made blank (e.g., black), and so on. Similarly, if the nodetime is less than the mediatime, the media may be output at a faster rate such that output is finished within the specified nodetime. In a further example, output of the media may be truncated. For instance, any portion of the segment defined by the mediatime that is greater than the nodetime is not output. In an implementation, the media timeline itself does not enforce these behaviors, but rather these behaviors are read by the timeline source 124 when rendering the media timeline 122 as described in relation to FIG. 1.

When the media stop 718 for the node 702 is not specified, the media referenced by the node 702 is output until completion. For example, in a player scenario, a user may desire the output of a playlist of media that does not have the duration of each media item referenced. Additionally, "back to back" output of the media included in the playlist may be desired. To represent this case on the media timeline, a sequence node may be created having leaf nodes that are children of the sequence node which do not have a specified media stop 718 properties.

Time Format 720

The time-based properties described previously may have an accompanying time format 720 property (time format). Examples of time formats include 100 nanosecond units, frame number, time code, and so on. Thus, the time format 720 may specify the time format for the start time 712, stop time 714, media start 716 and media stop 718. Additionally, the time format 720 may specify different formats for each of the time-based properties. For instance, the start and stop times 712, 714 may utilize a time format of 100 nanosecond units, while the media start 716 and media stop 718 time formats may utilize frame counts.

Stream Selection 722

The stream selection 722 property can be utilized on the node 702 in a variety of ways. For example, the stream selection 722 property may act as a filter such that media having desired characteristics is provided. The node 702, for instance, may reference both audio and video streams of media, such as a television program. The user, however, may only be interested in only the video stream, even if the URL 706 specified on the node 702 points to both the audio and video streams. In such a case, the audio stream from the mediais not exposed, such that it appears to the user that the node 702 provides only video media. Some other examples of stream selection include, selecting a language for the stream, selecting a bitrate for the stream, and so on. Additionally, files can contain multiple streams of the same major type. For example, some files contain many audio streams providing a choice of language and bitrate on each of these streams.

Format Based 724

Format based 724 properties may be utilized to specify other properties such as frame rate, pixel aspect ratio, audio sampling rate, and so on, that are desired from the node 702. The appropriate transforms for converting to/from these formats are then inserted into the rendered media timeline during playback.

Loop Count 726

The loop count 726 property may be used to specify how many times the rendering of the node 726 is to be repeated. For example, if the loop count 726 property is negative, the output of the media referenced by the node 702 may be repeated infinitely.

The node 702 may be disabled by setting the disabled 728 property. For example, if the disabled 728 property is set to "true", the node 702 is ignored during rendering of the media timeline. For instance, a sequence of three leaf nodes may be provided in a media timeline. If the second node in the media timeline is disabled, i.e. the disabled 728 property is set to "true", output of the media referenced by the media timeline will appear as if the media timeline has only the first and third nodes.

NoSkip 730

The NoSkip 730 property is a feature which can be used by timeline authors to specify media which cannot be skipped during rendering of the media timeline. When the node 702 is specified as a NoSkip node, i.e. the NoSkip property is set to "true", the user cannot skip to another node after the specified node 702, and cannot fast forward the media being output as part of that node 702. The user, however, may skip to any node "before" that node 702. In another implementation, if the NoSkip 730 property is specified on a parent node, the user will not be able to skip any of the children in the subtree of that node. In a further implementation, the NoSkip 730 property applies only to a sequence node and its immediate children, e.g. children of the sequence node that directly follow the sequence node instead of being included in a another sequence node that is a child of that sequence node, and is not specified for a parallel node or its immediate children. For example, the NoSkip 730 property may be used to prevent the skipping of advertisements referenced by leaf nodes that are children of a first sequence node. A second sequence node may also be a child of the first sequence node, and include leaf nodes that reference media that can be skipped, such as a television program.

The NoSkip 730 property may also be utilized to define collections of nodes through which a user may navigate. For example, a media timeline may include a sequence of ten leaf nodes, with the third and seventh nodes being NoSkip nodes, i.e. the NoSkip property is set as "true". Therefore, the user may skip the rendering of the first and second leaf nodes, but cannot skip to the fourth, fifth, sixth, seventh, eighth, ninth, or tenth nodes. Similarly during the rendering of the media timeline from node four to node seven, the user may skip to any node below the seventh node, but may not skip to a node "above" the seventh node, i.e. the eighth, ninth and tenth nodes.

NoSkip Child 732

Media timelines may support sparse children, i.e. all nodes are not loaded and/or created on the media timeline when the media timeline is initially loaded. Therefore, the children may be loaded and/or created as needed. Further discussion of dynamic loading and creation of nodes may be found in relation to FIGS. 12 and 13. When loading the nodes in a media timeline in this instance, parent nodes may be loaded which have child nodes that are specified as "NoSkip". To indicate that there is the NoSkip 730 property for a child node, the NoSkip child 732 property for the parent node may be used.

The NoSkip child 732 property may be set at a parent node to indicate whether the parent node includes a child node having the NoSkip 730 property set as "true". During the rendering of the media timeline, the NoSkip child 732 is used to indicate that all the previous siblings of a node should be checked to determine if navigation to the node is valid. NoSkip child 732 may also be set on a parallel node. For example, if any node in a subtree of the parallel node has the NoSkip 730 property set as "true". In this way, navigation between nodes may be provided that protects the use of the NoSkip 730 property.

When a node with the NoSkip 730 property set as "true" is added to the media timeline, the media timeline may automatically set the NoSkip Child 732 property as "true" on all the parents of the added node. This way a rendering engine, e.g. timeline source 124 of FIG. 1, can optimize which nodes of the media timeline to load and check to determine if the NoSkip 730 property is set as "true".

Timeline Effects

Timeline effects allow the author of a media timeline to specify components which analyze and/or change the appearance of the media. For example, the author might want to show a video in black & white, add echo to an audio file, show one video on top of another (e.g., picture in picture), and so on. In an implementation, an effect is not a separate node by itself. To provide the effect for the media, the author may specify effects in the metadata in the node. For example, the metadata may include an array of effects that are defined on the node. The array may specify a series of effects to be applied to the output of that node, i.e. when the media referenced by the node is rendered. In this implementation, the effect is not an object which actually implements the effect, but rather specifies properties and attributes which describe how to create and apply the effect. This is similar to how the node references the media in the previous implementations. For example, as discussed in relation to FIG. 3, the leaf nodes 308-312 themselves do no contain the media, but rather include respective metadata 320-324 having respective pointers 326, 328, 332 which specify how to obtain the media. The component which actually implements the effect is loaded at runtime by the timeline source that executes the media timeline. Although metadata that includes effect has been described, the effects may also be specified separately. Additionally, in another implementation, the effect is provided by an object in the media timeline that implements the effect.

Effects specified on nodes of a media timeline may have times that are specified relative to the start time of that node. For example, an effect may be specified on a leaf node that has a start time of ten seconds. Therefore, the effect will be applied to the node, when rendered, after that node has begun output and ten seconds have elapsed.

Multiple effects can be specified on a node. Additionally, the author of the media timeline may also control the order in which these effects are applied. For example, the author may set a priority on the effect. There are a variety of effects that may be specified by a node. Examples of effects that can be specified on the media timeline include: (1) a simple effect; (2) a composite effect; and (3) a transition effect. Further discussion of these exemplary effects may be found in relation to FIGS. 8-10.

Simple Effect

A simple effect represents a component which receives a single stream of audio/video and outputs another stream. In other words, it is a one-in/one-out component. For example, an echo effect may receive an audio stream and output a modified audio stream that echoes, provide a "black and white" effect in which video is shown as black and white, an age effect in which video is made to appear as if it was captured several decades ago, and so on.

Figure 8:
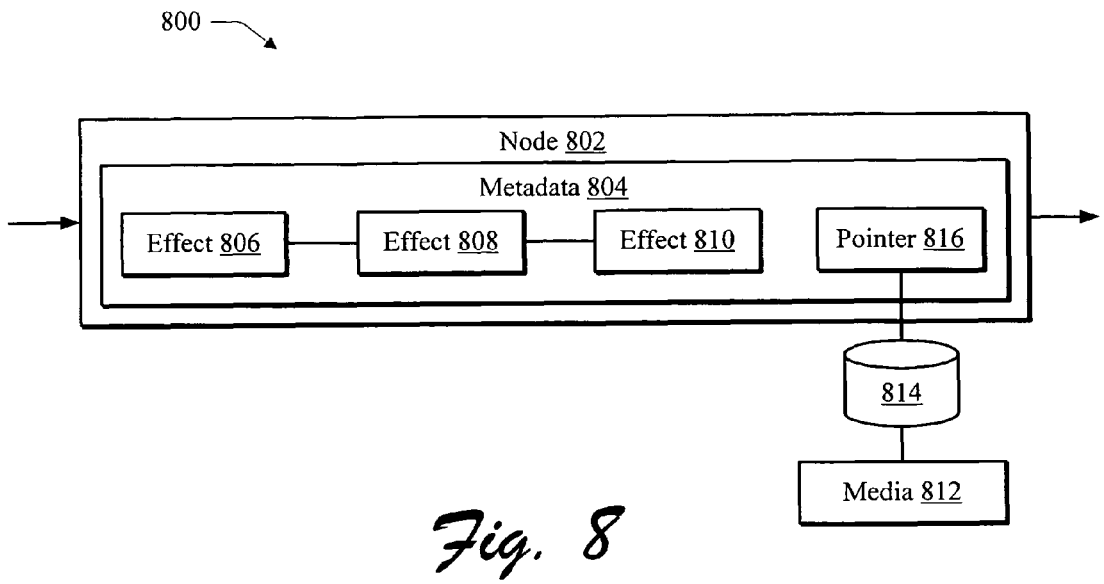
FIG. 8 is an illustration of a node in an exemplary implementation showing metadata included in the node that specifies a plurality of simple effects.

FIG. 8 is an illustration of an exemplary implementation 800 in which a node 802 includes metadata 804 that specifies a plurality of simple effects 806, 808, 810. As shown in FIG. 8, the plurality of simple effects 806-810 may be applied to media 812 included in a storage device 814 that is referenced by a pointer 816. In this example, the plurality of effects 806-810 are concatenated, i.e. the output for the first effect 806 goes to the input of the second effect 808 and so on, to provide the multiple effects to the media 812. Each of the plurality of effects 806-810 may be given a priority to provide an order for processing the effects. For instance, the priorities of the effects may determine the order the effects are concatenated. If there is a contention on the priority, the effects may be added in the order each effect was specified in the effect array.

In an implementation, the duration of the plurality of effects 806-810 does not change the duration of the media 812. For example, the processing of the plurality of effects 806-810 may be truncated at the time boundaries of the node 802. For instance, the rendering of the media 812 may have a duration of 10 seconds. The processing of the plurality of effects 806-810, however, may have a duration of 20 seconds. In such an instance, the timeline source 124 of FIG. 1 may finish processing of the plurality of effects 806-810 for node 802 at 10 seconds.

When defining the effects 806-810, the author of the timeline may explicitly specify the inputs and the outputs of each of the effects 806-810. For example, each of the effects 806-810 may include data that describes which stream is connected to which effect input. Each of the effects 806-810 may also have respective data that describes the major type of the respective effect's 806-810 output, e.g. audio, video, and so on. Further, each of the effects 806-810 may include metadata that describes a start time and/or a stop time of the effect within the node.

Composite Effects

Figure 9:
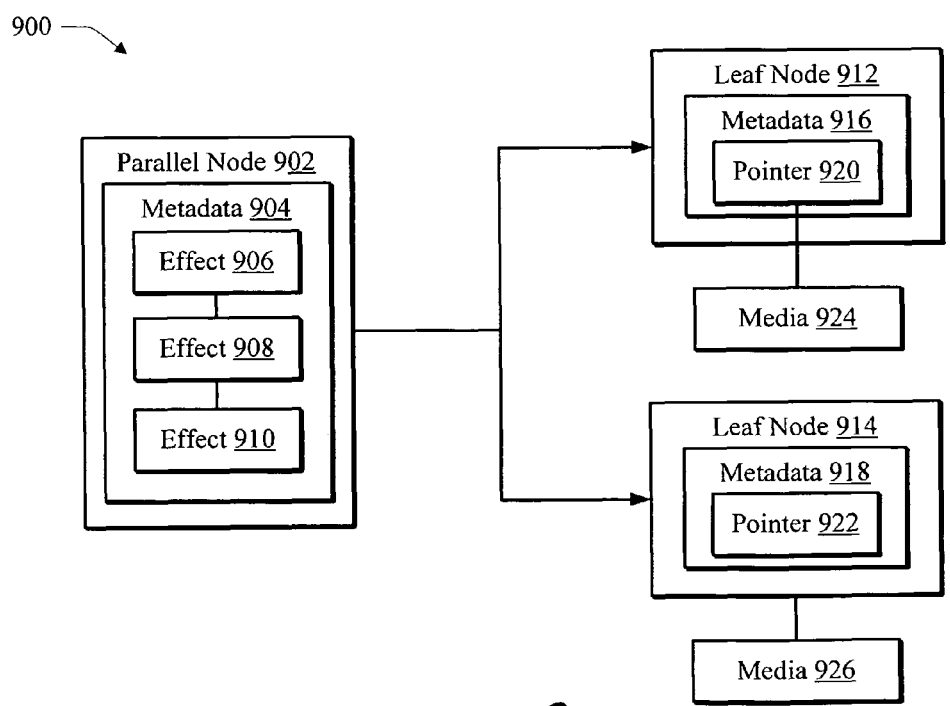
FIG. 9 is an illustration of an exemplary implementation showing a parallel node that provides a composite effect to the outputs of two or more child nodes.

A composite effect may be used to process media of the children of a parallel node to give a resultant output. For example, FIG. 9 is an illustration of an exemplary implementation 900 showing a parallel node 902 that provides a composite effect to the outputs of two or more child nodes. Parallel node 902 in this implementation is similar to the parallel node 602 that was described in relation to FIG. 6.

Parallel node 902 includes an array of composite effects 906, 908, 910. When specifying a composite effect, the author of the media timeline specifies how to connect the inputs of the effects 906-910 and also the major types for the outputs from the effects 906-910. For example, leaf node 912 and leaf node 914 may be configured as the children of the parallel node 902. As previously described, each leaf node 912, 914 includes respective metadata 916, 918 having respective pointers 920, 922 that reference respective media 924, 926. The leaf nodes 912, 914, when rendered, provide media 924, 926 for output.

The effects 906, 908, 910 are applied to the output of the media 924, 926 that are specified by the parallel node 902. For example, the parallel node 902 may provide a rotating cube with a different media (e.g., video) on each face of the cube, a scrolling roll of film with different media playing in each frame of the film, and so forth.

Although parallel node 902 was described as applying the plurality of effects 906-910 to each of the leaf nodes 912, 914, in additional implementations the parallel node 902 might apply the effects 906-910 to only a few of the children of the parallel node 902. In other words, the effects 906-910 need not be applied to all of the nodes that are children of the parallel node 902. For example, the metadata 904 and/or effects 906-910 may specify one or more particular nodes to apply one or more of the plurality of effects 906-910.

Transition Effect

Figure 10:
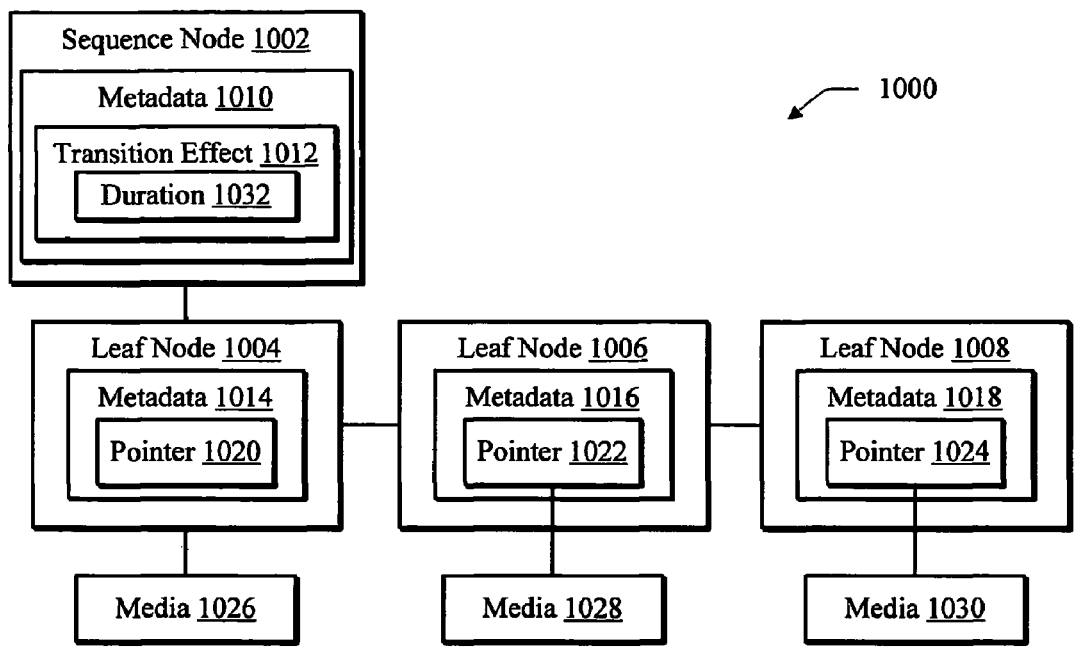
FIG. 10 is an illustration of an exemplary implementation in which a transition effect is specified to supply an effect between an output of media referenced by a previous node to an output of media referenced by a subsequent node.

FIG. 10 is an illustration of an exemplary implementation 1000 in which a transition effect is specified to supply an effect between an output of media referenced by a previous node to an output of media referenced by a subsequent node. In FIG. 10, a sequence node 1002 is shown that is similar to sequence node 402 that was described in relation to FIG. 4. The sequence node 1002 has a plurality of leaf nodes 1004, 1006, 1008 that are children of the sequence node 1002. Each of the plurality of leaf nodes 1004-1008 includes respective metadata 1014-1018 having respective pointers 1020-1024 that reference respective media 1026-1030.

The sequence node 1002 include metadata 1010 that describes a transition effect 1012 that is to be employed between output of the media 1026-1030 referenced by the respective leaf nodes 1004-1008. Thus, the transition effect 1012 is applied to the media 1026-1030 originating from the children of the sequence node 1002. The transition effect 1012 is utilized to combine two or more media 1026-1038 into a single output. Additionally, the transition effect 1012 may include data that specifies one or more of leaf nodes 1004-1008 to which the transition effect is to be applied. For example, the data may specify that the transition effect 1012 is to be employed between the output of media 1026, 1028. The first input to the transition effect 1012 is supplied by the node for which it is defined, i.e. leaf node 1004. The next input to the transition effect 1012 is the next node in the sequence, i.e. leaf node 1006. Example of transition effects include an audio cross fade between two nodes that are output in sequence, a "swipe" of a first video with a second video, and so on.

The transition effect 1012 has a duration 1032. The duration 1032 may be used to specify an amount of overlap desired between the two or more nodes in a sequence. For example, the second input in the sequence, i.e. media 1026, may be output such that it overlaps for the duration 1032 of the transition effect 1012. Hence, an output duration of the sequence node 1002 becomes a function of the times specified on the leaf nodes 1004-1008 and the overlap specified by the duration 1032 of the transition effect 1012.

Global effects may also be specified. For example, the transition effect 1012 may specify a global transition for each of the children of that node, e.g. leaf nodes 1004-1008 of sequence node 1002. Therefore, if the author of a media timeline desires the use of the same transition for all the leaf nodes 1004-1008, the author may do so by specifying the transition effect 1012 as a global transition. Thus, by specifying a global transition, the author need not specify a separate transition for each node.

Effect Metadata

Figure 11:
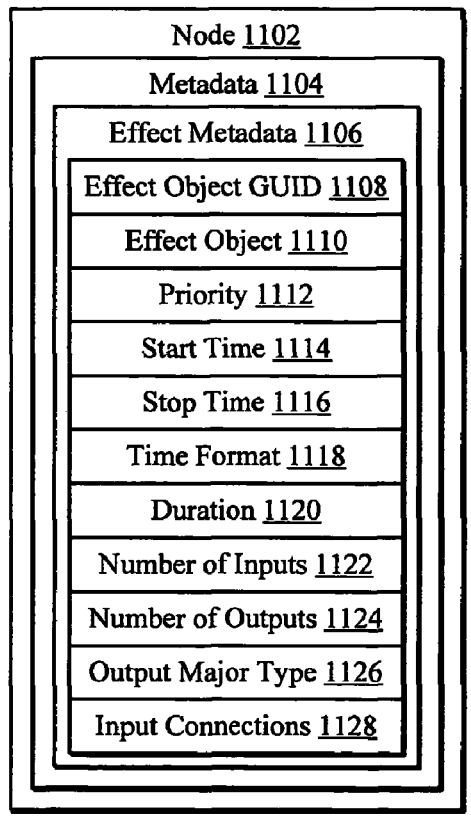
FIG. 11 is an illustration of an exemplary implementation showing a node having metadata that includes a plurality of effect metadata.

FIG. 11 is an illustration of an exemplary implementation 1100 showing a node 1102 having metadata 1104 that includes a plurality of effect metadata 1106. Like the metadata 704 specified on the node 702 as described in relation to FIG. 7, the effect metadata 1106 may also specify a variety of properties for an effect. For example, the effect metadata 1106 may define standard properties which have a specific meaning for the media timeline. The effect metadata 1106 may be used to configure transform objects which are utilized to provide the effect. Transform objects, for instance, may publish their own set of properties, which are used to configure the transform object to provide the effect. For example, for a color converter transform object there are specific properties for controlling the hue, saturation and brightness. In addition to these properties, other custom properties of interest may be specified for the effect. The following is a listing of examples of effect metadata 1106 that is supported by the media timeline.

Effect Object GUID 1108

Similar to how nodes may reference media, an effect may reference a transform object that provides the effect. The effect object GUID 1108 property specifies the GUID to be used to create the transform object that provides the effect. For example, during output of the media, the transform object referenced by the effect object GUID 1108 may be created when needed to provide the effect.

Effect Object 1110

The node 1102 may utilize the effect object 1110 property as a pointer to reference an effect object that provides the effect. The referenced effect object may be used directly during output of the media of the node 1102. The effect object 1110 property takes precedence over the effect GUID, if both are specified.

Priority 1112

As previously described, when effects are concatenated together, the priority 1112 property may be used to specify the ordering of the effects. If there is more than one effect with the same priority, the effects are applied in the order in which the effects were added to the node 1102.

Start Time 1114, Stop Time 1116

The start and stop times 1114, 1116 are specified relative to the node 1102 on which the effect is specified. The start and stop times 1114, 1116 define the time at which the effect will be active. If these properties are not specified, the effect will be applied for the entire duration of the output of the media referenced by the node 1102. These properties can be applied to both simple effects that were described in relation to FIG. 8 and composite effects that were described in relation to FIG. 9.

Time Format 1118

The start and stop times 1114, 1116 may be specified in a variety of formats. The time format 1118 property may be used to specify the format of these time values. A variety of time formats may be utilized, such as 100 nano-second units, frame numbers, time codes, and so on.

Duration 1120

As previously described in relation to FIG. 10, the duration 1120 property may be used to specify the duration of a transition between the output of respective media. For example, the duration 1120 may be used to specify an amount of overlap between the output of media referenced by two consecutive nodes.

Number of Inputs 1122, Number of Outputs 1124

Simple effects utilize one input and one output, and therefore the number of inputs and outputs 1122, 1124 may be set automatically in the media timeline for simple effects. A transition effect may employ two inputs and one output. Therefore, the number of inputs and outputs 1122, 1124 may also be set automatically in the media timeline for transition effects. For composite effects, an author may define as many inputs and/or outputs as desired. Therefore, the number of inputs and outputs 1122, 1124 may be set by the author to reflect the number of inputs and outputs for the transform object that provides the effect.

Output Major Type 1126

The output major type 1126 is specified for each output of the effect. Specifying output major type 1126 property facilitates connecting the effect to other effects or destinations. For example, the author of a media timeline may readily determine the major type, i.e. audio, video, and so on, of the output and therefore efficiently specify connections between relevant effects, e.g. audio effect to audio effect.

Input Connections 1128

Once the effect has been defined, the author may specify media that is to be processed by the effect. The input connections 1128 property may be used to identify the media to be connected to each of the effect inputs.

Dynamic Creation and Loading of Nodes of a Media Timeline

Dynamic creation and loading of nodes of a media timeline may be utilized for efficient rendering of the media timeline. By improving rendering efficiency, the media timeline may be utilized on low resource devices, such as devices having limited hardware and/or software resources. For example, dynamic creation of the media timelines may include delayed creation of the nodes of the media timeline. The children of a parent node, for instance, need not be created until needed. The delayed creation of the nodes may be utilized to improve start-up and response times for media timelines having a significant number of nodes and/or a large amount of data for each node. For instance, a media player may be utilized to create and playback a playlist from a media library that contains a significant number of selections. Creating such a playlist might require multiple queries to the media library, which may take a significant amount of time, processor and memory resources. By using delayed creation of the nodes, the playlist can be built on an "as needed" basis, thereby utilizing only as much processing and memory resources as required by the nodes needed at any one particular time. There are a wide variety of implementations that may be utilized for dynamic creation and/or loading of nodes of a media timeline.

Figure 12:
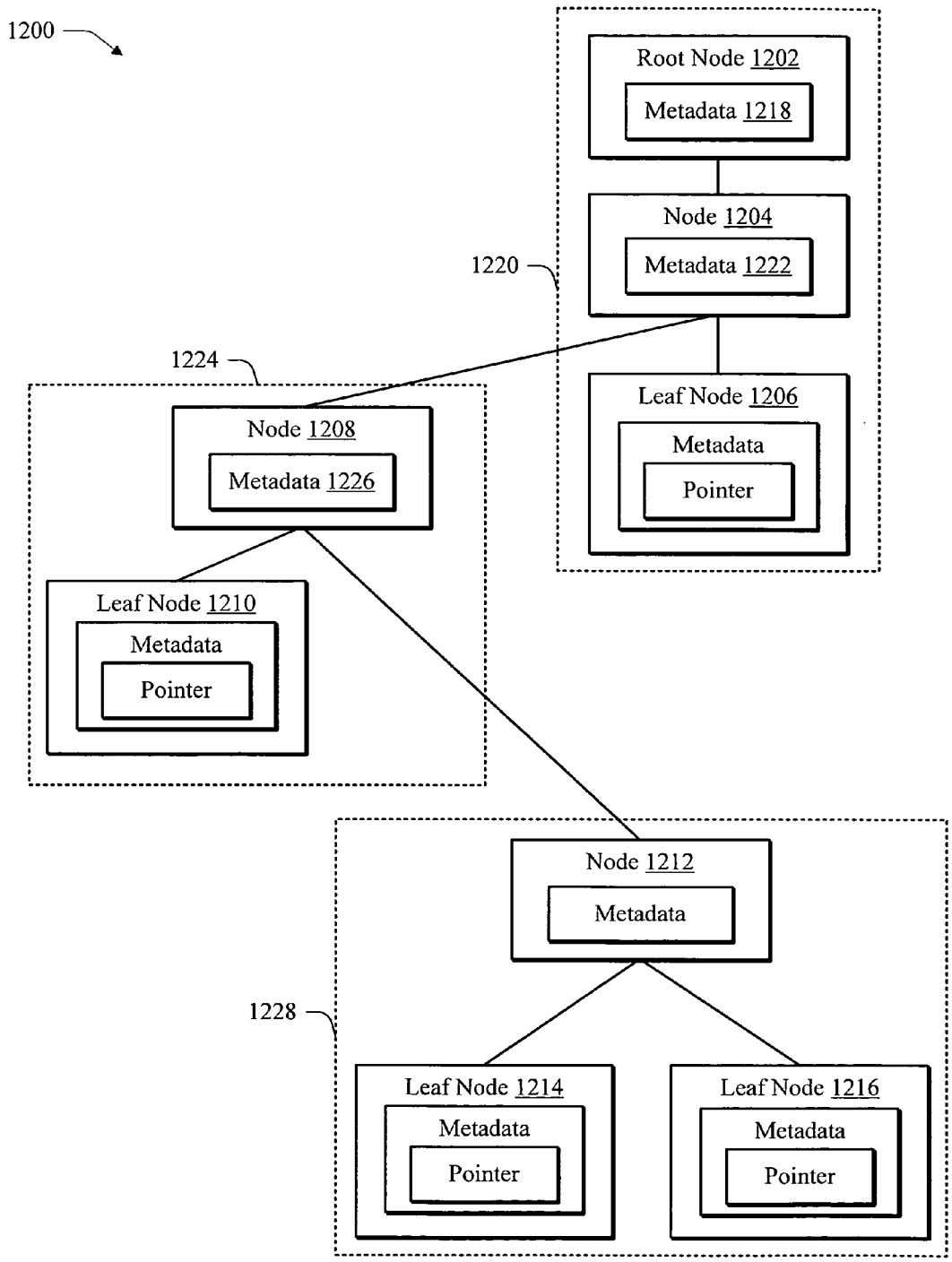
FIG. 12 is an illustration a media timeline in an exemplary implementation of dynamic loading in which the nodes of the media timeline are loaded based on metadata that is included in the nodes.

FIG. 12 is an illustration of an example of a media timeline 1200 in an exemplary implementation in which the nodes of the media timeline are dynamically loaded based on metadata that is included in the nodes. The media timeline 1200 is illustrated as a tree structure that includes a root node 1202 and a plurality of nodes 1204-1216 that are children of the root node 1202. To render the media timeline 1200, the root node 1202 is first implemented and the metadata 1218 contained therein is examined. The metadata 1218 specifies a first grouping 1220 that includes nodes 1204, 1206. Therefore, when the root node 1202 is rendered, node 1204 and node 1206 are also loaded for rendering.

During or after the rendering of media referenced by the node 1206, metadata 1222 of node 1204 is examined that specifies a second grouping 1224 that includes node 1208 and 1210. Therefore, node 1208 and 1210 are loaded and media is output that is referenced by node 1210. Likewise, the metadata 1226 of node 1208 specifies a third grouping 1228 that includes nodes 1212, 1214, 1216. Therefore, nodes 1212, 1214, 1216 are loaded to output data referenced by nodes 1214, 1216 after the output of data referenced by node 1210 is completed.

Figure 13:
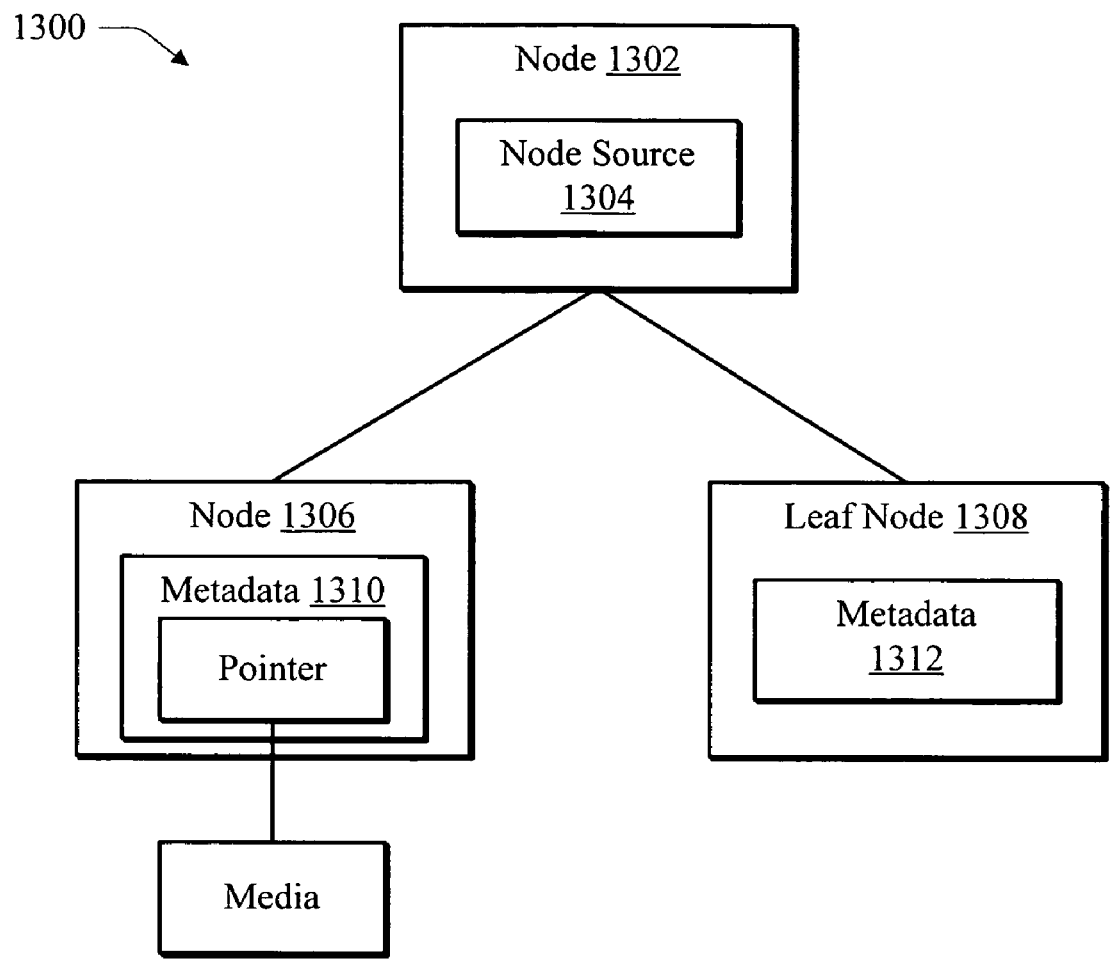
FIG. 13 is an illustration of a media timeline in an exemplary implementation of dynamic loading in which the nodes of the media timeline are defined and implemented on an as-needed basis by a node source.

FIG. 13 is an illustration of a media timeline 1300 in an exemplary implementation in which the nodes of the media timeline are defined and implemented on an "as needed" basis by a node source. In the previous implementation that was described in relation to FIG. 12, the media timeline 1200 was previously created and the nodes loaded on an "as needed" basis. In this implementation, the author defines a number of nodes that are children of a node 1302 of the media timeline 1300. The nodes are then created on an "as needed" basis during the rendering of the media timeline 1300. This is performed by attaching a node source 1304 module (node source) to the node 1302. The node source 1304 includes sufficient data such that, when executed, the node source 1304 may create the children of the node 1302, i.e. nodes 1306, 1308, and "fill-out" the properties of the nodes 1306, 1308, such as to supply metadata 1310, 1312 that defines properties and interrelationships as previously described in relation to FIG. 7. Therefore, when a particular one of the nodes 1306, 1308 is needed, the node source 1304 is implemented, e.g. called, to create the particular one of the nodes 1306, 1308. The node source 1304, for instance, may be executed to create the nodes 1306, 1308 in response to a request from the timeline source 124 of FIG. 1.

Dynamic Changes to Nodes in a Media Timeline

In one or more implementations, the media timelines are configured to be dynamically changed. For example, nodes of the media timeline may be removed, added or changed during the rendering of the media timeline by a timeline source. To provide for dynamic changes to the nodes, each node can generate events.

Figure 14:
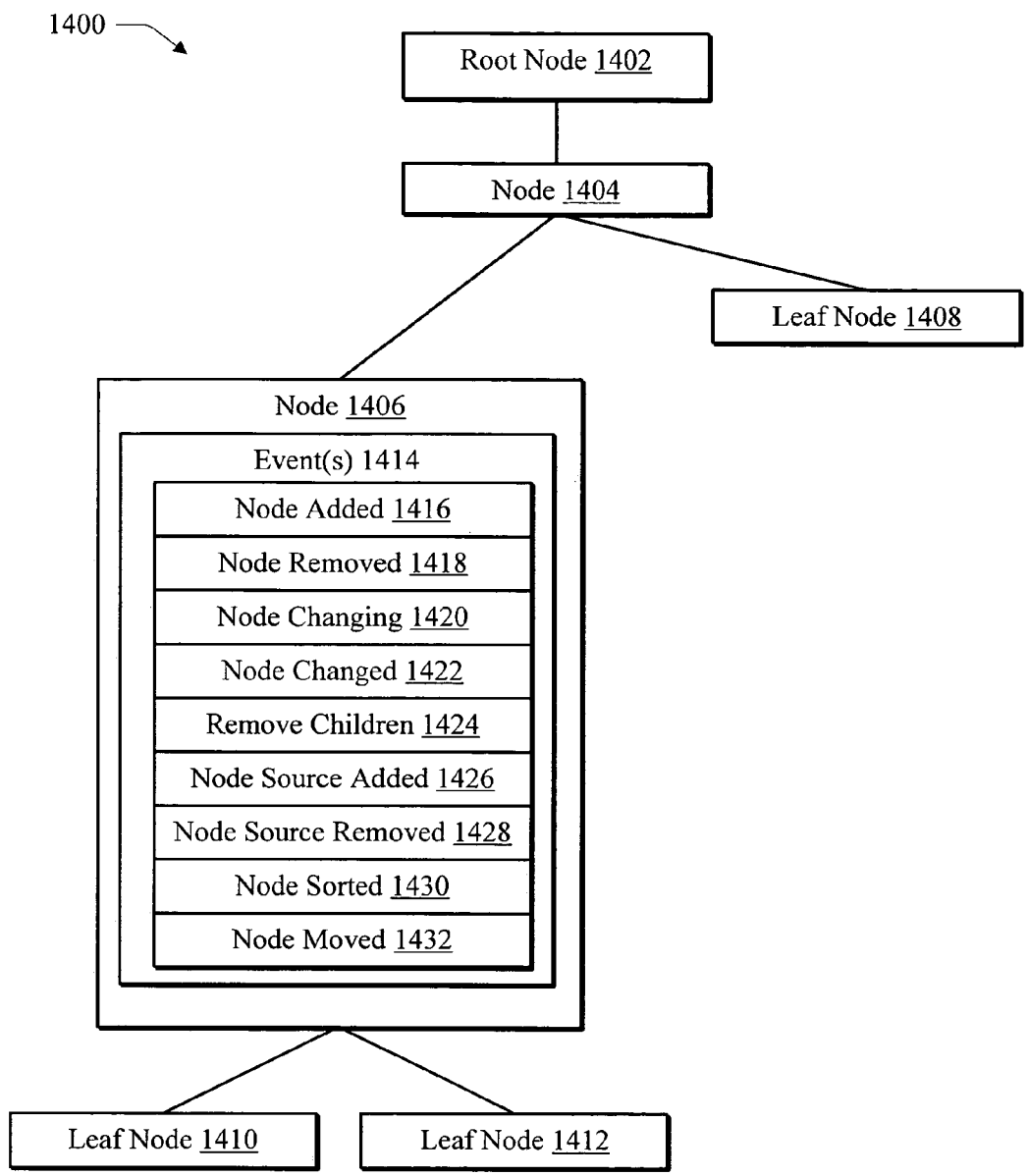
FIG. 14 is an illustration of a media timeline in an exemplary implementation in which events are provided by a node such that changes that occur to the media timeline may be communicated to nodes that may be affected by the changes.

FIG. 14 is an illustration of a media timeline 1400 in an exemplary implementation in which events are provided by a node to such that changes that occur to the media timeline 1400 may be communicated to nodes that may be affected by the changes. The media timeline 1400 includes a root node 1402 and a plurality of nodes 1404-1412 that are children of the root node 1402. Nodes 1408-1410 are utilized to reference media as previously described.

Each of the nodes 1402-1412 may generate events that may be utilized to inform other nodes of the media timeline 1400 that may be affected by changes to the node and/or changes to children of that node. For example, all events for node 1406 and any children of the node 1406, i.e. nodes 1410-1412, may be communicated to the root node 1402 and/or the author of the media timeline 1400. In other words, events in the media timeline 1400 may progress "up" the tree to the root of the tree. In this way, eventing may be utilized inform various nodes of the media timeline 1400 about dynamic changes to the timeline structure. Additionally, nodes of the media timeline 1400 may subscribe to events initiated by other nodes of the media timeline. Node 1408, for instance, may subscribe to receive events from node 1406 even though node 1408 is not a "parent" of the node 1406. Furthermore, components using the timeline, e.g. the media foundation 204 components of FIG. 2, can register to receive events initiated by any of the nodes. A variety of events 1414 may be supported by one or more nodes 1402-1412, examples of which are described as follows.

Node Added 1416

This event is issued when a node is added to the media timeline 1400. For example, node 1412 may be added to the media timeline 1400 to provide output of additional media referenced by the node 1412. Node 1406, when informed of the adding of node 1412, may issue the node added 1416 event such that it is communicated to the root node 1402 through node 1404. Thus, in this example, each node 1402-1406 that is a parent of the newly added node 1412 is notified of events that are initiated by children of that node.

Node Removed 1418

The node removed 1418 event is issued when a node is removed from the media timeline 1400. Continuing with the previous example, node 1412 may be removed from the media timeline 1400 to remove the output of the media referenced by the node 1412. Node 1406, when informed of the removal of node 1412, may issue the node removed 1418 event such that it is communicated to the root node 1402 through node 1404. Thus, in this example, each node 1402-1406 that is a parent of the removed node 1412 is also notified.

Node Changing 1420

The node changing 1420 event is issued when metadata on a node of the media timeline 1400 is being changed. Node 1406, for instance, may include metadata, such as the metadata 704 described in relation to FIG. 7. Changes to the metadata may cause the node 1406 to issue the node changing 1420 event, which may be communicated to the application 202 of FIG. 2 and/or parents of the node 1406, i.e. nodes 1402, 1404. Thus, the node changing 1420 event may be utilized to inform other nodes and/or applications that utilize the node that changes are being made to the node 1406, and therefore respond according, such as to wait to render the node until a node changed 1422 event is received.

Node Changed 1422

The node changed 1422 event is issued when metadata on a node of the media timeline 1400 has been changed. Continuing with the previously example, node 1406 issued the node changing 1420 event such that other nodes and/or applications are informed that changes are being made to the node 1406. When the changes are complete, the node 1406 may issue the node changed 1422 event to inform the applications and/or nodes that the changes have been completed. In this way, the node 1406 may utilize the node changed 1422 event to inform that it is ready for rendering.

Remove Children 1424

The remove children 1424 event is issued when all of the children of a node are removed. Nodes 1410, 1412, for instance, may be removed from the media timeline 1400. Node 1406 issues the remove children 1424 event to inform the root node 1402 that the children, i.e. nodes 1410, 1412, of node 1406 have been removed. Thus, the remove children 1424 event may be utilized instead of issuing the node removed 1418 for each of the nodes 1410, 1412.

Node Source Added 1426, Node Source Removed 1428

The node source added 1426 event is issued when a node source is added to a node, such as the node source 1304 described in relation to FIG. 13. Likewise, the node source removed 1426 event is issued when a node source is removed from a node.

Node Sorted 1430

The node sorted 1430 event is issued when one or more nodes are sorted. For example, the media timeline 1400 may support a function in which the nodes 1402-1412 are sorted according to one or more criteria, such as chronologically, based on dependencies, and so forth. Therefore, the node sorted 1430 event may be initiated by the node 1406 when that node and/or children of the node 1406 (e.g., nodes 1410, 1412) are sorted.

Node Moved 1432

The node moved 1432 event is issued when a node is moved. For example, the node 1406 may be moved in the media timeline 1400 such that the node 1406 is a child of a different node, e.g. node 1402. Therefore, the node moved 1432 event may be initiated by the node 1406 and/or a parent of the node (e.g. the previous parent and/or the new parent node) when node 1406 is moved.

Read-Only Media Timelines

The author of a media timeline can mark all or a portion of the media timeline as read-only. This may be utilized to protect the functionality of the media timeline. In a first scenario, the author of the timeline does not want the user to change the media experience, such as to skip and/or delete advertisements. In another scenario, the author might want to dynamically change the media timeline, but does not want other components to modify it. In yet another scenario, the author might allow other components to set custom metadata on the timeline nodes, but not add new children to the timeline.

The media timeline can be customized to suit one or all of these read-only scenarios. Read-only media timelines may be implemented by creating a read-only wrapper of a media timeline. The read-only wrapper contains nodes which mirror the structure of the original timeline, i.e. are "cloned" from the nodes of the original timeline. The cloned nodes of the read-only media timeline may contain pointers back into the original timeline's nodes. Additionally, each of the cloned nodes may be configured to subscribe to events generated on the nodes of the original timeline. This allows the cloned timeline's structure to be kept updated as the original media timeline changes, such as changes to the structure of the "tree" of the original media timeline.

The cloned nodes of the read-only media timeline may be configured to fail functions which allow the user to add/remove nodes to the read-only media timeline. When creating a read-only timeline, the author may also specify whether metadata for the cloned nodes should be modifiable. This design allows the author of the media timeline to modify the media timeline as much as desired while other components, e.g. applications that execute the read-only media timeline, have read-only or restricted access to the media timeline structure.

In an implementation, metadata 314 of the root node 302 of the media timeline 300 of FIG. 3 may be marked such that the media timeline 300 may not be edited by a user. In another implementation, a particular node and/or groupings of nodes of the media timeline may be marked as read-only. For example, referring again to FIG. 3, the metadata 320 of leaf node 308 may be marked as read-only. In another example, the metadata 318 of node 306 is marked as read-only such that node 306, leaf node 310 and leaf node 312 may not be edited.

Exemplary Media Timeline Implementations

The media timelines previously discussed may employ a variety of methods of storing and restoring timeline data, such as one or more Windows® Media Player Playlist files, eXecutable Temporal Language (XTL) files, and so on.

A media timeline, for instance, may be described as the following Windows® Media Player Playlist file identified by an ASX file extension.

<Asx Version="3.0">
<Entry>
<Ref href="file://\\wmp\content\mpeg\Boom.mpe"/>
</Entry>
<Entry>
<Ref
 href="\\wmp\content\Formats\MovieFile\chimp.mpg"/>
</Entry>
<Entry>
<Ref href="file://\\wmp\content\mpeg\Boom.mpe"/>
</Entry>
</Asx>

Figure 15:
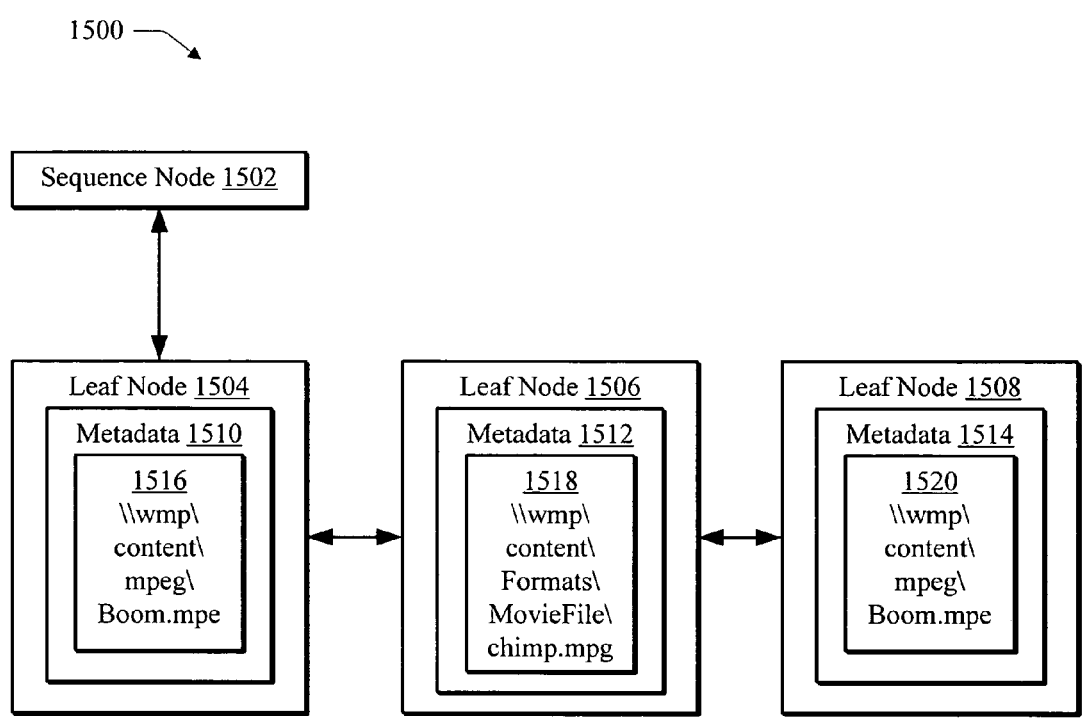
FIG. 15 is an illustration of an exemplary implementation showing a media timeline that includes a sequence node and three leaf nodes described by a Windows® Media Player Playlist file identified by an ASX file extension.

This ASX file specifies three files for output, back to back. No start and stop times have been specified for the files. The ASX file may be represented by the media timeline 1500 shown in FIG. 15 that includes a sequence node 1502 and three leaf nodes 1504, 1506, 1508. Each of the leaf nodes 1504-1508 includes respective metadata 1510, 1512, 1514 that describes respective sources 1516, 1518, 1520 for media to be output by the media timeline 1500.

Another example of a media timeline is shown in the following XTL file.

<timeline>
<group type="video">
 <track>
<clip src="V1.wmv" start="0" stop="30" mstart="50" mstop="80"/>
<clip src="V2.wmv" start="30" stop="40" mstart="0"/>
 </track>
</group>
<group type="audio">
 <track>
<clip src="A1.asf" start="20" stop="40" mstart="0"/>
<clip src="A2.asf" start="40" stop="60" mstart="0"/>
 </track>
</group>
</timeline>

This XTL file describes two tracks, e.g., streams, of media for output. One of the tracks is an audio track and the other is a video track.

Figure 16:
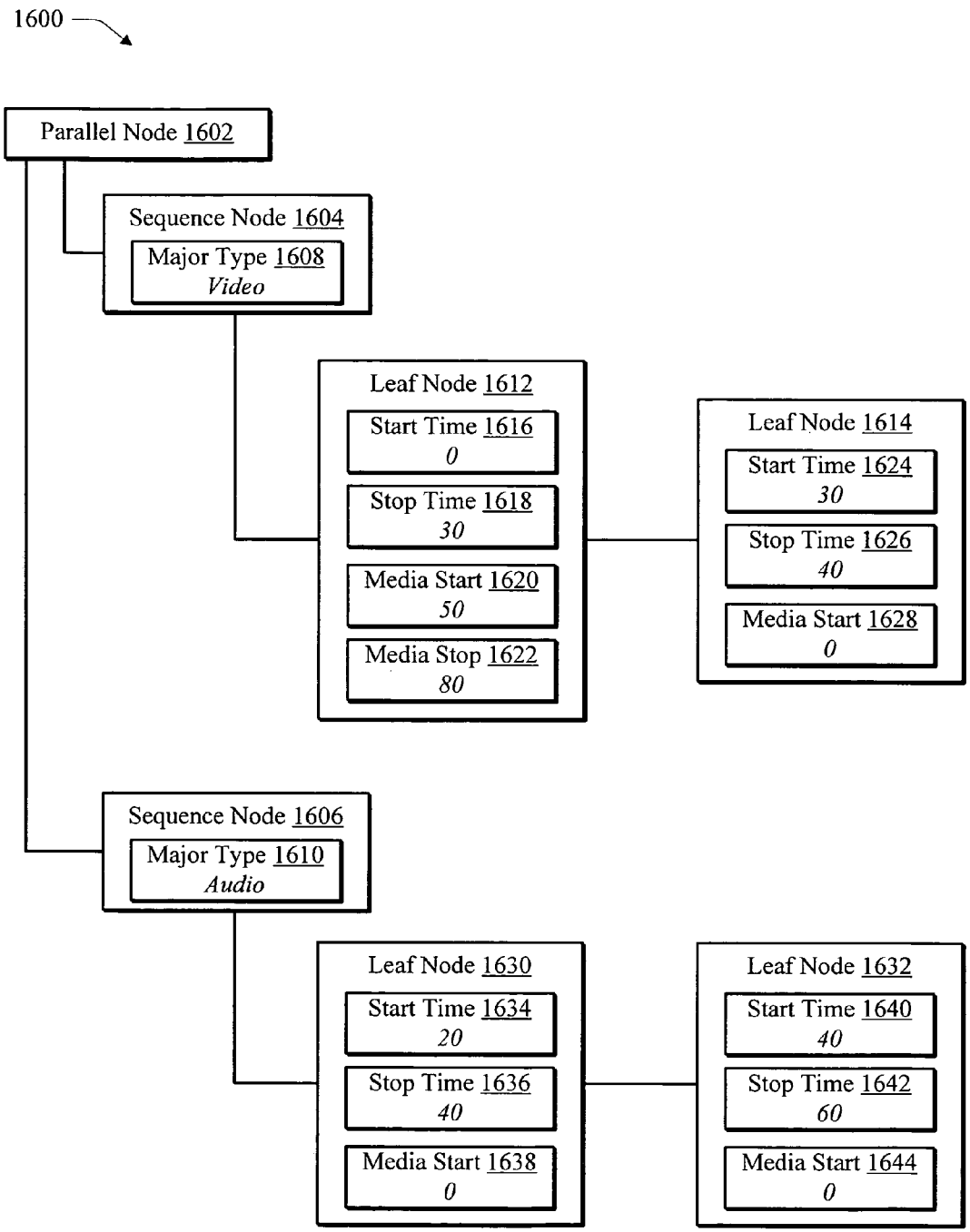
FIG. 16 is an illustration of an exemplary implementation showing a media timeline that includes a parallel node having two child sequence nodes that are described by an eXecutable Temporal Language (XTL) file.

The XTL file may be represented by the media timeline 1600 that is shown in FIG. 16 that includes a parallel node 1602 having two child sequence nodes 1604, 1606. In this example, sequence node 1604 has a major type 1608 filter set as "video" and sequence node 1606 has a major type 1610 filter set as "audio". Sequence node 1604 has two child leaf nodes 1612, 1614. Leaf node 1612 includes metadata that specifies a start time 1616 of "0", a stop time 1618 of "30", a media start 1620 of "50", and a media stop 1622 as "80". Leaf node 1614 include metadata that specifies a start time 1624 of "30", a stop time 1626 of "40", and media start 1628 as "0". It should be noted that leaf node 1614 does not include a media stop time, therefore the entire length of the media referenced by the leaf node 1614 will be output.

Sequence node 1606 also has two child leaf nodes 1630, 1632. Leaf node 1630 includes metadata that specifies a start time 1634 of "20", a stop time 1636 of "40", and a media start 1638 of "0". Leaf node 1632 include metadata that specifies a start time 1640 of "40", a stop time 1642 of "60", and media start 1644 of "0".

Figure 17:
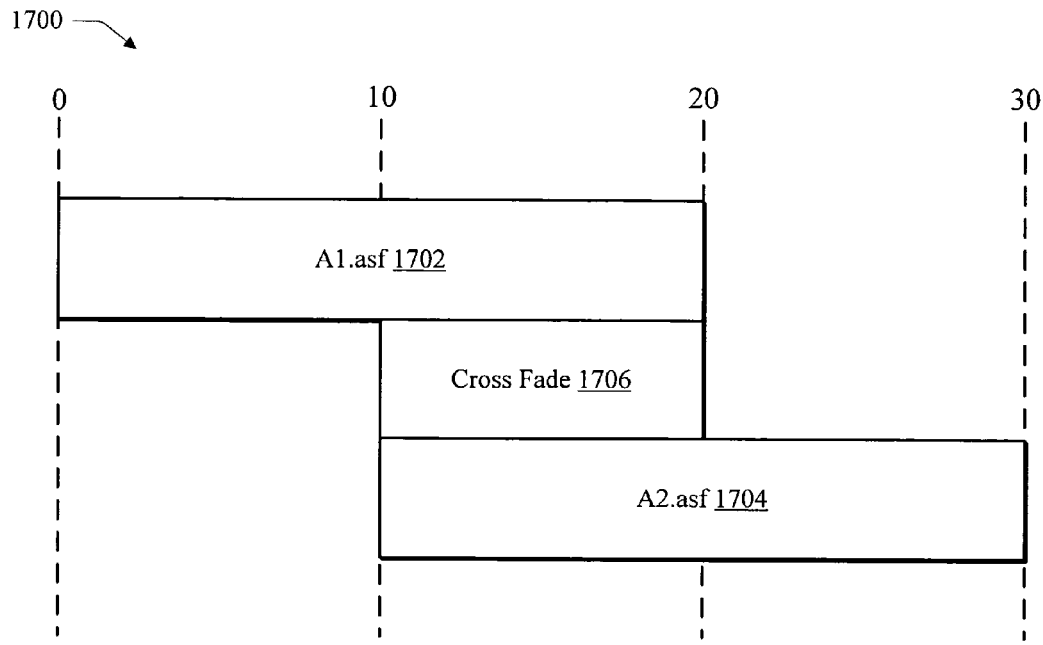
FIG. 17 is an illustration of an exemplary implementation showing an output of first and second media over particular time intervals and including an effect to transition between the first and second media.

FIG. 17 is an illustration of an exemplary implementation showing an output 1700 of first and second media over a specified time period that utilizes an effect to transition between the first and second media. In the illustrated example, A1.asf 1702 and A2.asf 1704 are two different audio files. A1.asf 1702 has an output length 20 seconds and A2.asf 1704 also has an output length 20 seconds. A cross fade 1706 effect is defined between the outputs of A1.asf 1702 and A2.asf 1704. In other words, the cross fade 1706 is defined to transition from the output of A1.asf 1702 to the output of A2.asf 1704. The cross fade 1706 effect is initiated at 10 seconds into the output of A1.asf 1702 and ends at the end of the output of A1.asf 1702. Therefore, the output of A2.asf 1704 is also initiated at 10 seconds. The cross fade 1706 is shown as inputting two different media, i.e. A1.asf 1702 and A2.asf 1704, and providing a single output having the desired effect.

Figure 18:
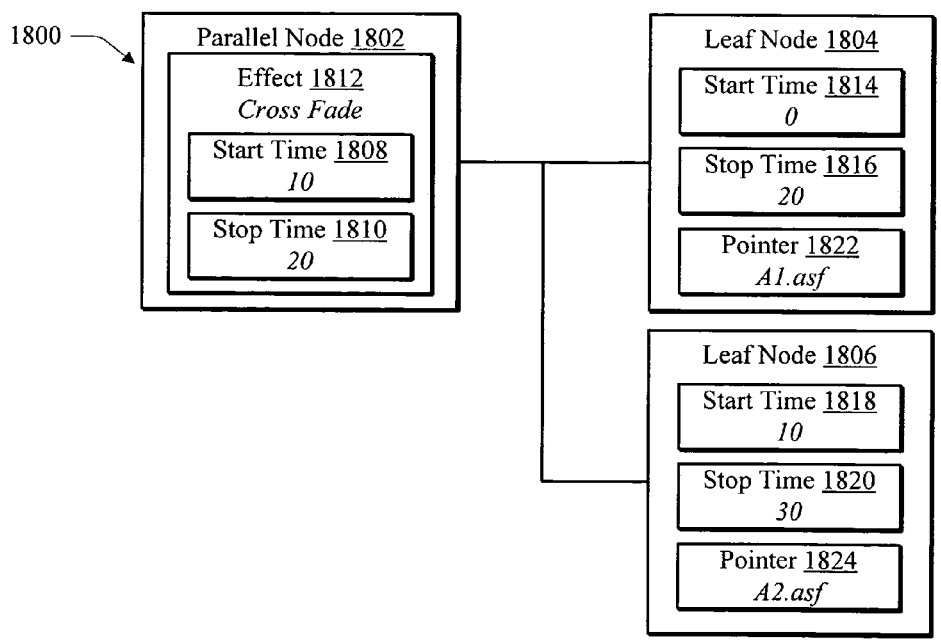
FIG. 18 is an illustration of a media timeline in an exemplary implementation that is suitable to implement the cross fade effect of FIG. 17.

FIG. 18 is an illustration of a media timeline 1800 in an exemplary implementation that is suitable to implement the cross fade 1706 effect of FIG. 17. The media timeline 1800 includes a parallel node 1802 having two children, i.e. leaf nodes 1804, 1806. The parallel node 1802 includes metadata that specifies a start time 1808 of zero seconds and a stop time 1810 of twenty seconds. The parallel node 1802 also includes a composite effect 1812 that describes a cross fade. The leaf node 1804 includes metadata indicating a start time 1814 of zero seconds and a stop time 1816 of twenty seconds. Leaf node 1806 includes metadata having a start time 1818 of ten seconds and a stop time 1820 of thirty seconds.

Leaf node 1804 also includes a pointer 1822 that references the A1.asf 1702 file described in relation of FIG. 17. Likewise, leaf node 1806 includes a pointer 1824 that references the A2.asf file 1704 that was described in relation to FIG. 17. Thus, when the media timeline 1800 is executed, the A1.asf 1702 file and the A2.asf file 1704 are output in a manner that employs the effect 1812 as shown in FIG. 17.

Exemplary Procedures

A variety of procedures may be implemented utilizing the media timeline previously described in relation to FIGS. 1-18. Exemplary procedures describing the generation and utilization of the media timeline will be discussed in relation to FIGS. 19-23

Figure 19:
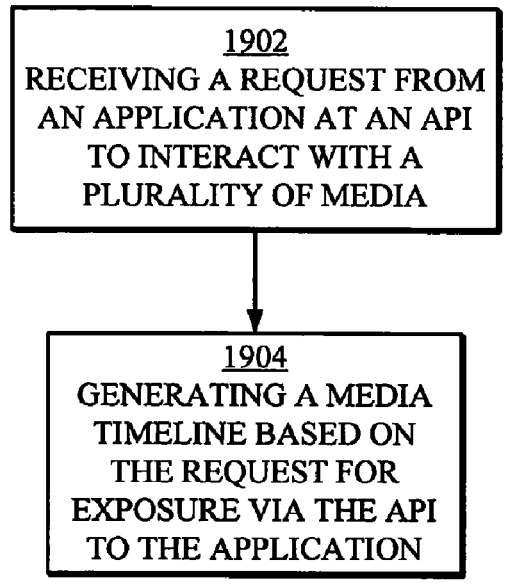
FIG. 19 is a flow chart depicting a procedure in an exemplary implementation in which a request is utilized to generate a media timeline.

FIG. 19 is a flow chart depicting a procedure 1900 in an exemplary implementation in which a request is utilized to generate a media timeline. At block 1902, a request is received from an application at an API to interact with a plurality of media. For example, the application 202 of FIG. 2 may form and communicate a request to the media foundation 204, which receives the request. The request may include a playlist that specifies a plurality of media for output.

At block 1904, a media timeline is generated based on the request. The media timeline is configured for exposure via the API to the application. To continue with the previous example, the media timeline may be generated to include at least one node for each media item referenced in the playlist. Additionally, the media timeline may be structured to correspond to the structure of the playlist, such as a sequence of media, concurrent output of media items, and so forth. The media timeline may be exposed to the application 202 of FIG. 2 for rendering such that the media items referenced by the media timeline are rendered. Additionally, the media items referenced by the media timeline may have different formats, one to another. In this way, the media timeline provides a technique for the application 202 of FIG. 2 to control the output of media without the application 202 having to specifically address each media format.

Figure 20:
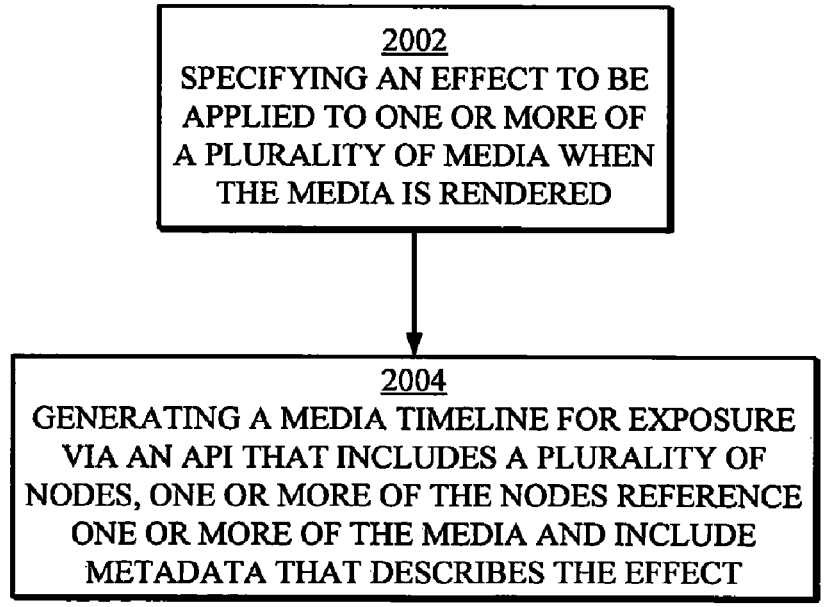
FIG. 20 is a flow chart depicting a procedure in an exemplary implementation in which an effect is specified for application to media referenced by a media timeline.

FIG. 20 is a flow chart depicting a procedure 2000 in an exemplary implementation in which an effect is specified for application to media referenced by a media timeline. At block 2002, an effect is specified to be applied to one or more of a plurality of media when the media is rendered. For example, a user may interact with the timeline generator 120 of FIG. 1 to author the media timeline 122. The timeline generator 120 may provide a user interface (UI) for interaction by the user to select components for inclusion in the media timeline 122, such as the components of the media foundation 204 described in relation to FIG. 2. In another example, the effect may be specified programmatically by the application 202 through interaction with the media foundation 204 of FIG. 2.

At block 2004, a media timeline is generated for exposure via an API that includes a plurality of nodes. One or more of the nodes reference one or more of the media and include metadata that describes the effect. The nodes of the timeline, for instance, may include metadata that references a transform object that is utilized to apply the effect to the media referenced by the node. Therefore, when the media timeline is rendered, the node referencing the media and the effect may be utilized to output the media having the applied effect.

Figure 21:
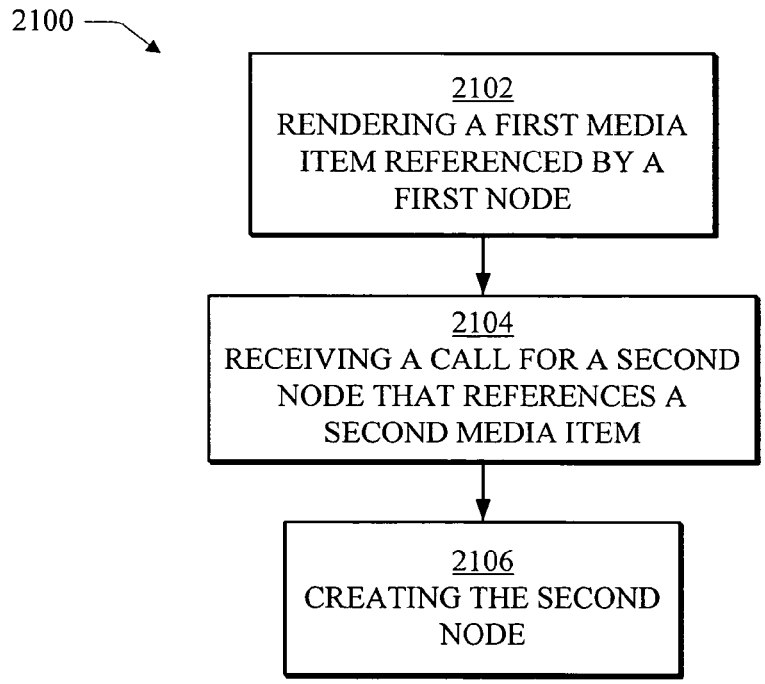
FIG. 21 is a flow chart depicting a procedure in an exemplary implementation showing dynamic creation of a node of a media timeline.

FIG. 21 is a flow chart depicting a procedure 2100 in an exemplary implementation showing dynamic creation of a node of a media timeline. As previously described, the media timeline may include a plurality of nodes and may be exposed via an API. At block 2102, a first media item referenced by a first node of the media timeline is rendered. At block 2104, a call is received for a second node of the media timeline that references a second media item. The call may be received at the API from an application. In response to the call, at block 2106, the second node is created. In an implementation, the second node is created during the rendering of the first media item.

Figure 22:
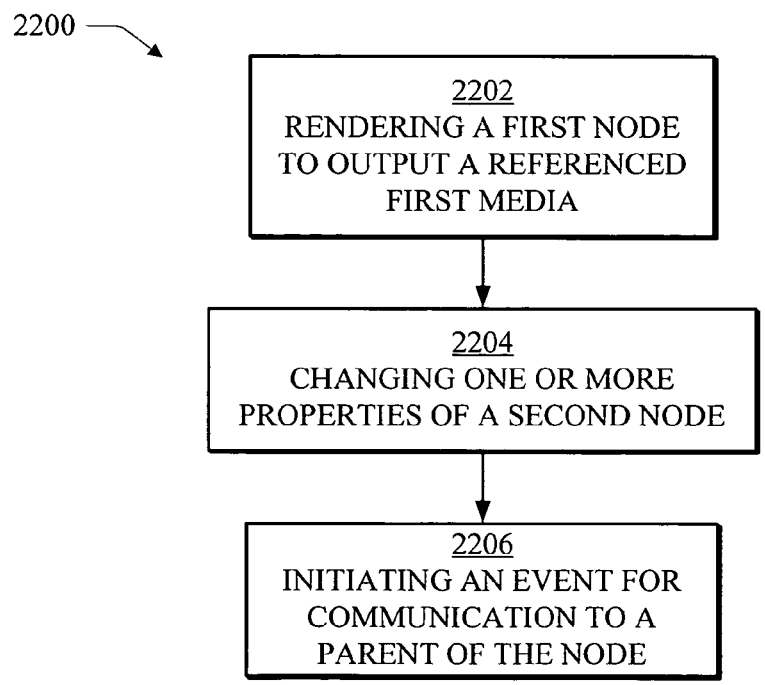
FIG. 22 is a flow chart depicting a procedure in an exemplary implementation showing dynamic changes to a media timeline.

FIG. 22 is a flow chart depicting a procedure 2200 in an exemplary implementation showing dynamic changes to a media timeline. The media timeline may include a plurality of nodes and may be exposed via an API. At least two of the nodes may reference respective media. At block 2202, a first node of the media timeline is rendered to output a referenced first media. For example, the first node of the media timeline may reference a video clip, and the first node is rendered such that the video clip is output for display in a window specified by the application 202 of FIG. 2.

At block 2204, one or more properties of a second node of the media timeline are changed. For example, the metadata described in relation to FIG. 7 may be changed, the second node may be moved such that it is a child of a different parent node, and so forth. At block 2206, an event is initiated by an event generator located on the second node. The event is for communication to a parent of the second node and describes the changing of the one or more properties. Thus, the events may be utilized such that changes may be made to the media timeline during the rendering of the media timeline.

Figure 23:
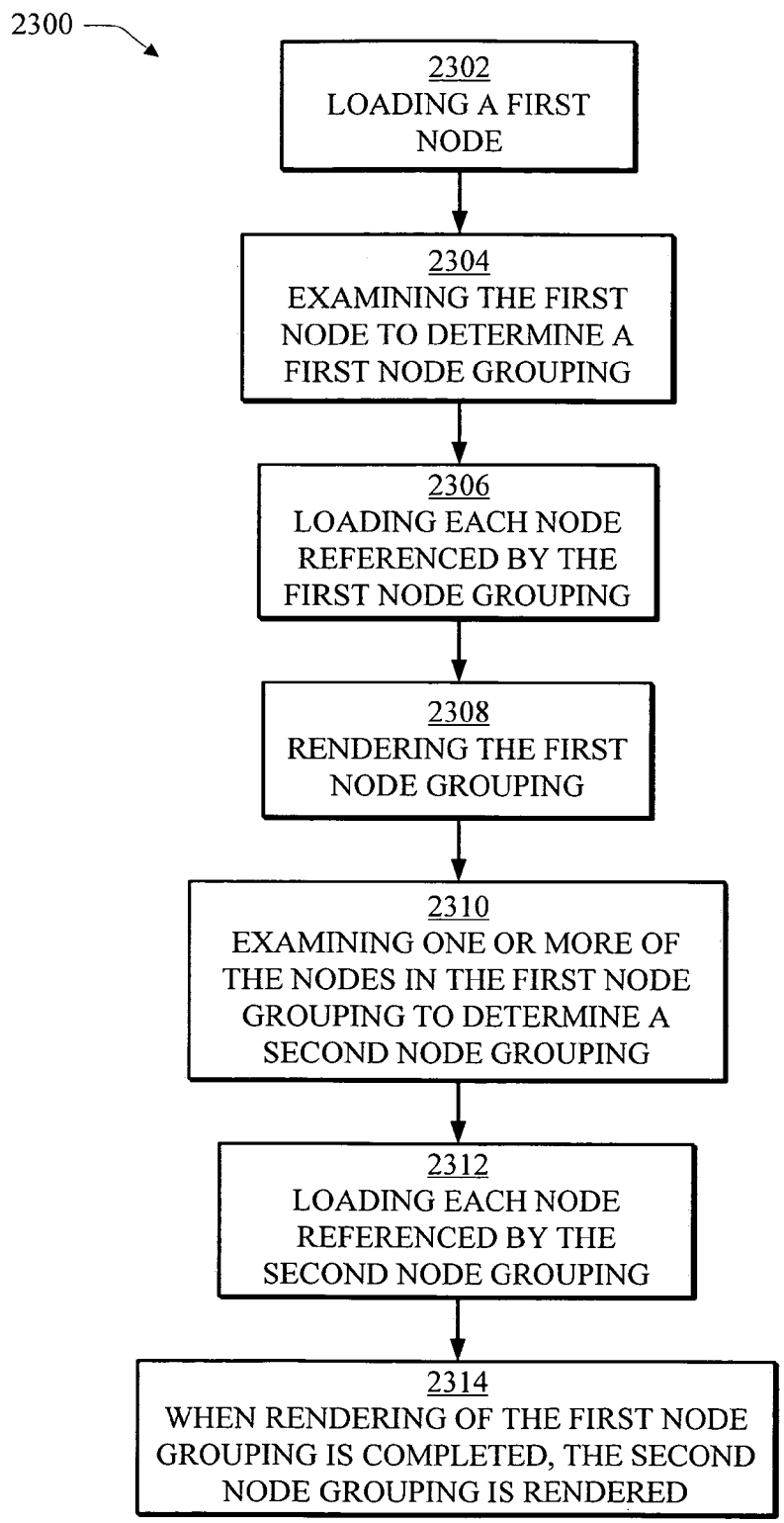
FIG. 23 is a flow chart depicting a procedure in an exemplary implementation showing dynamic loading of nodes of a media timeline.

FIG. 23 is a flow chart depicting a procedure 2300 in an exemplary implementation showing dynamic loading of nodes of a media timeline. As previously described, the media timeline may include a plurality of nodes, at least two of which reference respective media. Additionally, one or more of the nodes may each have metadata that references a node grouping.

At block 2302, a first node of the media timeline is loaded for rendering. At block 2304, the first node is examined to determine a first node grouping. For instance, the first node may include metadata that describes a collection of the nodes of the media timeline that are to be loaded in conjunction with the first node. At block 2306, each node referenced by the first node grouping is loaded, and at block 2308, the first node grouping is rendered. For example, the nodes of the first node grouping may be rendered to output data referenced by the nodes.

At block 2310, one or more of the nodes in the first node grouping are examined to determine a second node grouping. In an implementation, the one or more nodes are examined during the rendering of the first node grouping. At block 2312, each node referenced by the second node grouping is loaded. In an implementation, the nodes of the second node grouping are loaded during the rendering of the nodes in the first node grouping. At block 2314, when rendering of the first node grouping is completed, the second node grouping is rendered. Thus, nodes of the second node grouping may be loaded and wait for the rendering of the first node grouping to be completed such that there is no delay between the rendering of the nodes in the successive groupings.

Exemplary Operating Environment

Figure 24:
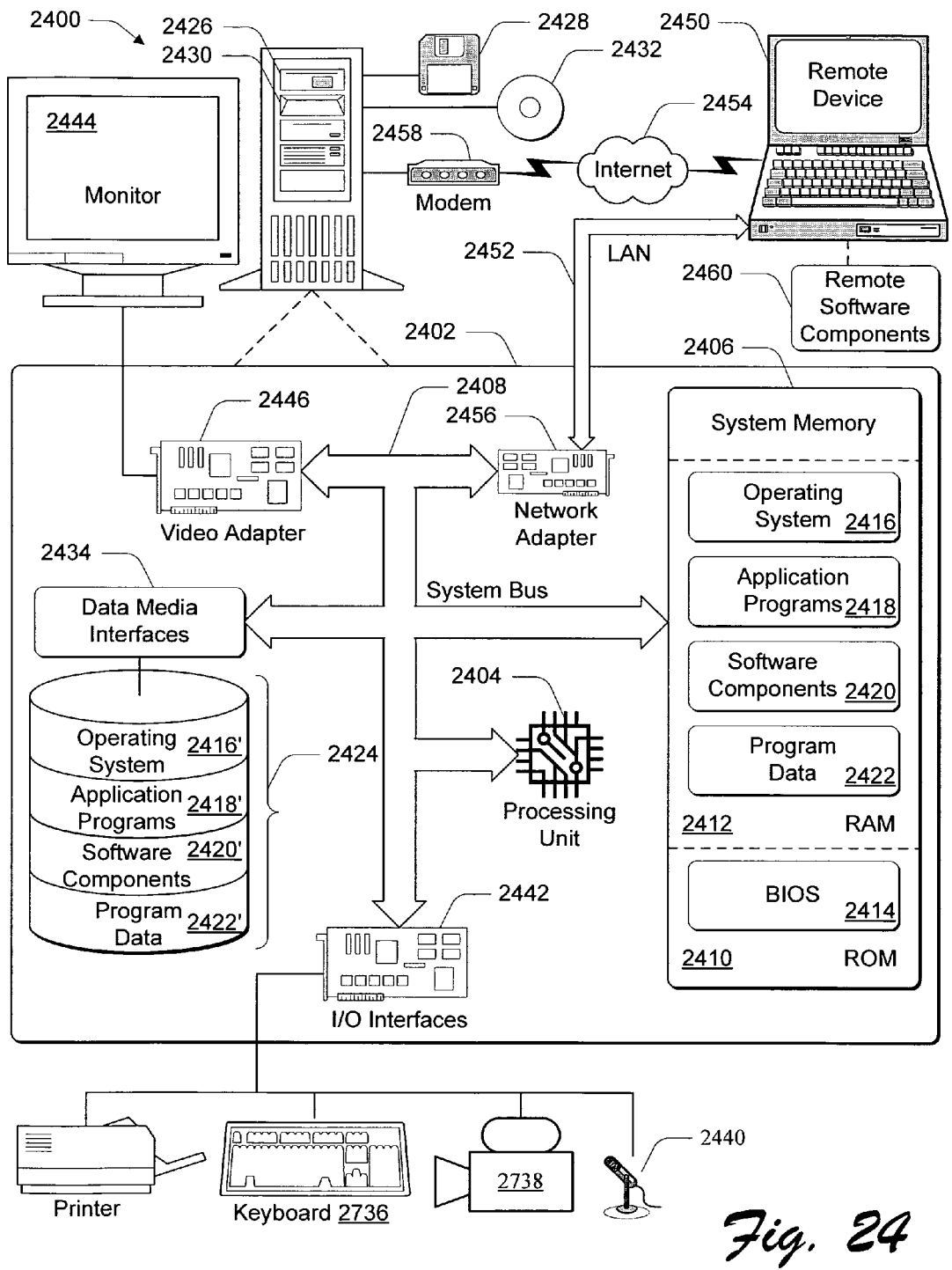
FIG. 24 is an illustration of an exemplary operating environment.

The various components and functionality described herein are implemented with a number of individual computers. FIG. 24 shows components of a typical example of a computer environment 2400, including a computer, referred by to reference numeral 2402. The computer 2402 may be the same as or different from computer 102 of FIG. 1. The components shown in FIG. 24 are only examples, and are not intended to suggest any limitation as to the scope of the functionality of the invention; the invention is not necessarily dependent on the features shown in FIG. 24.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, network-ready devices, minicomputers, mainframe computers, distributed computing environments that include any of the above systems or devices, and the like.

The functionality of the computers is embodied in many cases by computer-executable instructions, such as software components, that are executed by the computers. Generally, software components include routines, programs, objects, components, data structures, etc. that perform particular tasks or implement particular abstract data types. Tasks might also be performed by remote processing devices that are linked through a communications network. In a distributed computing environment, software components may be located in both local and remote computer storage media.

The instructions and/or software components are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 24, the components of computer 2402 may include, but are not limited to, a processing unit 2404, a system memory 2406, and a system bus 2408 that couples various system components including the system memory to the processing unit 2404. The system bus 2408 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 2402 typically includes a variety of computer-readable media. Computer-readable media can be any available media that can be accessed by computer 2402 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 2402. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 2406 includes computer storage media in the form of volatile and/or nonvolatile memory such as read only memory (ROM) 2410 and random access memory (RAM) 2412. A basic input/output system 2414 (BIOS), containing the basic routines that help to transfer information between elements within computer 2402, such as during start-up, is typically stored in ROM 2410. RAM 2412 typically contains data and/or software components that are immediately accessible to and/or presently being operated on by processing unit 2404. By way of example, and not limitation, FIG. 24 illustrates operating system 2416, application programs 2418, software components 2420, and program data 2422.

The computer 2402 may also include other removable/non-removable, volatile/nonvolatile computer storage media. By way of example only, FIG. 24 illustrates a hard disk drive 2424 that reads from or writes to non-removable, nonvolatile magnetic media, a magnetic disk drive 2426 that reads from or writes to a removable, nonvolatile magnetic disk 2428, and an optical disk drive 2430 that reads from or writes to a removable, nonvolatile optical disk 2432 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2424 is typically connected to the system bus 2408 through a non-removable memory interface such as data media interface 2434, and magnetic disk drive 2426 and optical disk drive 2430 are typically connected to the system bus 2408 by a removable memory interface.

The drives and their associated computer storage media discussed above and illustrated in FIG. 24 provide storage of computer-readable instructions, data structures, software components, and other data for computer 2402. In FIG. 24, for example, hard disk drive 2424 is illustrated as storing operating system 2416', application programs 2418', software components 2420', and program data 2422'. Note that these components can either be the same as or different from operating system 2416, application programs 2418, software components 2420, and program data 2422. Operating system 2416', application programs 2418', software components 2420', and program data 2422' are given different numbers here to illustrate that, at a minimum, they are different copies. A user may enter commands and information into the computer 2402 through input devices such as a keyboard 2436, and pointing device (not shown), commonly referred to as a mouse, trackball, or touch pad. Other input devices may include source peripheral devices (such as a microphone 2438 or camera 2440 which provide streaming data), joystick, game pad, satellite dish, scanner, or the like. These and other input devices are often connected to the processing unit 2402 through an input/output (I/O) interface 2442 that is coupled to the system bus, but may be connected by other interface and bus structures, such as a parallel port, game port, or a universal serial bus (USB). A monitor 2444 or other type of display device is also connected to the system bus 2408 via an interface, such as a video adapter 2446. In addition to the monitor 2444, computers may also include other peripheral rendering devices (e.g., speakers) and one or more printers, which may be connected through the I/O interface 2442.

The computer may operate in a networked environment using logical connections to one or more remote computers, such as a remote device 2450. The remote device 2450 may be a personal computer, a network-ready device, a server, a router, a network PC, a peer device or other common network node, and typically includes many or all of the elements described above relative to computer 2402. The logical connections depicted in FIG. 24 include a local area network (LAN) 2452 and a wide area network (WAN) 2454. Although the WAN 2454 shown in FIG. 24 is the Internet, the WAN 2454 may also include other networks. Such networking environments are commonplace in offices, enterprise-wide computer networks, intranets, and the like.

When used in a LAN networking environment, the computer 2402 is connected to the LAN 2452 through a network interface or adapter 2456. When used in a WAN networking environment, the computer 2402 typically includes a modem 2458 or other means for establishing communications over the Internet 2454. The modem 2458, which may be internal or external, may be connected to the system bus 2408 via the I/O interface 2442, or other appropriate mechanism. In a networked environment, program modules depicted relative to the computer 2402, or portions thereof, may be stored in the remote device 2450. By way of example, and not limitation, FIG. 24 illustrates remote software components 2460 as residing on remote device 2450. It will be appreciated that the network connections shown are exemplary and other means of establishing a communications link between the computers may be used.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
receiving a request, from an application at an application programming interface (API), to interact with a plurality of media comprising streaming media; and
generating an original media timeline based on the request, wherein the original media timeline:
is exposed to the application via the API;
includes a plurality of nodes;
defines a presentation, to be output via one or more computers, of a first media referenced by a first node with respect to a second media referenced by a second node, wherein:
the first and second nodes are configured as parallel nodes such that the media referenced by the first node that is a child of a parent node is rendered concurrently with the media referenced by the second node that is a child of the same parent node;
the original media timeline is configured for dynamic creation, automatically by the one or more computers without human user interaction, such that at least one node is dynamically created while at least one of the media referenced by the plurality of nodes of the original media timeline is being rendered; and
at least one node includes metadata, the metadata describing:
rendering of the at least one node; and
a collection of additional nodes to be dynamically modified when the original media timeline is rendered; and
specifies, automatically by the one or more computers without human user interaction, delayed creation of one or more of the plurality of nodes when the media timeline is rendered, wherein the delayed creation includes creating the one or more of the plurality of nodes when called by the application.

2. A method as described in claim 1, wherein one or more nodes are configured as a sequence node such that one node that is a child of the sequence node is rendered after another node that is also a child of the sequence node.

3. A method as described in claim 1, wherein one or more nodes is configured as a root node that specifies a starting point for rendering the original media timeline.

4. A method as described in claim 1, wherein the first and second said nodes reference the respective first and second media utilizing respective first and second pointers.

5. A method as described in claim 1, wherein the metadata is selected from a group of metadata, the group of metadata consisting of:
- a uniform resource locator (URL) property for the media referenced by the at least one node;
- a source object property that specifies a source object which can resolve to a media source that provides the media referenced by the at least one node;
- a source object identifier (ID) property that specifies a unique identifier of the source object;
- a media start property that specifies a time, during a duration of the media referenced by the at least one node, that rendering of the media is to be started;
- a media stop property that specifies a time, during a duration of the media referenced by the at least one node, that rendering of the media is to be stopped;
- a time format property that specifies a time format for at least one of the media start property, and the media stop property;
- a stream selection property which specifies one of a plurality of streams for rendering of the media referenced by the at least one node;
- a format based property that specifies a format for the media referenced by the at least one node;
- a loop count property that specifies a number of times the at least one node is to be rendered;
- a disabled property that specifies whether the at least one node is to be rendered when the original media timeline is rendered;
- a generic property that serves as a repository of information related to the at least one node, wherein the generic property is configured for specification by at least one of the application and a timeline source for rendering the original media timeline;
- a noskip property that specifies that the rendering of the at least one node is not to be skipped when the original media timeline is rendered; and
- a noskip child property that specifies that the at least one node has another node, which is a child of the at least one node, which specifies that the rendering of the other node is not to be skipped when the original media timeline is rendered.

6. A method as described in claim 1, wherein at least one node is configured to reference an effect to be applied to an output of media referenced by the node.

7. A method as described in claim 1, wherein the original media timeline is configured for dynamic loading such that metadata included in at least one node specifies a collection of nodes to be loaded when the original media timeline is rendered.

8. A method as described in claim 1, wherein at least one node of the original media timeline is specified as read-only by creating a read-only wrapper of the original media timeline.

9. A method as described in claim 1, wherein at least one node is configured for communication of events to another node such that a change may be made to the original media timeline while the original media timeline is rendered.

10. A method as described in claim 1, wherein the first and second media have different formats.

11. One or more computer storage devices storing computer executable instructions that, when executed by a computer, direct the computer to perform the method of claim 1.

12. A method as recited in claim 8, wherein a node specified as read-only disables functionality comprising one or more of:
- skipping and/or deleting advertisements;
- modifying the media timeline by other components while allowing dynamic changes to the original media timeline; or
- adding new children to the original media timeline while allowing other components to set custom metadata on the original media timeline nodes.

13. A method as recited in claim 8, wherein the read-only wrapper contains cloned nodes that mirror a structure of the original media timeline.

14. A method as recited in claim 13, wherein the cloned nodes are configured to subscribe to events generated on the nodes of the original media timeline such that the structure of cloned nodes is kept updated as the original media timeline changes.

15. A method comprising:
generating a media timeline by an application, wherein the media timeline:
- includes a plurality of nodes referencing media comprising streaming media;
- defines a presentation of a first media referenced by a first node with respect to a second media referenced by a second node, the presentation being configured to be output by one or more computers;
- specifies, automatically by the application executing on the one or more computers without human user interaction, that one or more of the plurality of nodes is created in a delayed manner in response to being called by one or more applications while the media timeline is being rendered; and
- is configured, automatically by the application executing on the one or more computers without human user interaction, for dynamic creation such that at least a first node grouping is created while media referenced by a second node grouping in the media timeline is being rendered; and passing the media timeline to a timeline source for rendering.

16. A method as described in claim 15, wherein the first and second media have different formats.

17. A method as described in claim 15, wherein at least one node is configured to reference an effect to be applied to an output of media referenced by the node.

18. A method as described in claim 15, wherein the media timeline is configured for dynamic loading such that metadata included in at least one node specifies a collection of nodes to be loaded when the media timeline is rendered.

19. One or more computer storage devices storing computer executable instructions that, when executed by a computer, direct the computer to perform the method of claim 15.

20. A method as described in claim 15, wherein the media timeline is configured for dynamic loading such that metadata included in at least one node specifies a collection of nodes to be loaded when the media timeline is rendered, the collection of nodes comprising a parallel node that includes metadata specifying a plurality of leaf nodes for simultaneous rendering.

21. A method for outputting a media presentation via one or more computers comprising:

specifying an effect to be applied to one or more of a plurality of media comprising streaming media when the media is rendered; and generating a media timeline configured for exposure via an application programming interface (API), wherein:
the media timeline includes a plurality of nodes;
two or more of the plurality of nodes reference respective media;
one or more of the plurality of nodes that reference the one or more of the plurality of media include metadata that controls the effect to be applied to the one or more of the plurality of media when the media is rendered;
the media timeline specifies, automatically by the one or more computers without human user interaction, delaying creation of one or more of the plurality of nodes when the media timeline is rendered, wherein delaying the creation includes at least one of the one or more computers automatically creating the one or more of the plurality of nodes when called by one or more applications;
the media timeline being configured for dynamic creation, automatically by the one or more computers without human user interaction, such that at least one node of the plurality of nodes is created while the media timeline is rendered; and
at least one node of the plurality of nodes includes metadata, the metadata describing:
rendering of the at least one node of the plurality of nodes; and
a collection of additional nodes of the plurality of nodes to be dynamically modified when the at least one node of the plurality of nodes is rendered.

22. A method as described in claim 21, wherein the effect is a simple effect provided by a software component that is configured to:
receive a single stream of media;
apply the effect to the single stream; and
output the applied single stream.

23. A method as described in claim 21, wherein the effect is a composite effect provided by a software component that is configured to:
receive at least two streams of media;
apply the effect to the at least two streams; and
output a single stream of media composed of the applied at least two streams.

24. A method as described in claim 21, wherein the effect is a composite effect provided by a software component that is configured to analyze at least two streams of media or output at least two streams of media.

25. A method as described in claim 21, wherein the effect is a transition effect to be applied as a transition from a first media referenced by a first node to a second media referenced by a second node.

26. A method as described in claim 21, wherein the effect includes metadata that describes the effect that is selected from the group of metadata, the group of metadata comprising:
an effect object globally unique identifier (GUID) property that specifies a GUID to be used to create a transform object that is configured to provide the effect;
an effect object property that references an effect object that is configured to provide the effect;
a priority property that specifies an ordering of a plurality of effects, one to another;
a media start property that specifies a time, during a duration of the media referenced by the node, that rendering of the media is to be started;
a media stop property that specifies a time, during a duration of the media referenced by the node, that rendering of the media is to be stopped;
a time format property that specifies a time format for at least one of the media start property and the media stop property;
a number of inputs property that specifies a number of inputs to the effect;
a number of outputs property that specifies a number of outputs from the effect;
an output major type property that specifies a major type for media, to which, the effect is to be applied; and
an input connections property that specifies the one or more nodes that are to be processed by the effect.

27. A method as described in claim 21, wherein the media timeline is configured for dynamic loading such that metadata included in at least one node specifies a collection of nodes to be loaded when the media timeline is rendered.

28. A method as described in claim 21, wherein at least one node is specified as read-only.

29. A method as described in claim 21, wherein at least one node is configured for communication of events to another node such that a change may be made to the media timeline while the media timeline is rendered.

30. One or more computer storage devices storing computer executable instructions that, when executed by a computer, cause the computer to perform the method of claim 21.

31. In a media timeline exposed via an application programming interface and having a plurality of nodes, a method comprising:
rendering a first media item of a plurality of media items, at least one of the plurality of media items comprising a streaming media item, the first media item being referenced by a first node of a first node type of a plurality of node types, the plurality of node types comprising a sequence node type that includes metadata describing a rendering order of a plurality of leaf nodes to the sequence node;
receiving a call for a second node that references a second media item;
dynamically creating automatically, without user intervention, the second node of a second node type of the plurality of node types, while rendering the first media item;
wherein the media timeline is configured for automatic dynamic updating, automatically by the one or more computers without human user interaction, such that metadata included in at least one node specifies a collection of nodes to be modified when the at least one node is loaded; and
delaying, automatically by the one or more computers without human user interaction, creation of one or more of the collection of nodes when the media timeline is rendered, wherein the delayed creation includes a computer automatically creating the one or more of the collection of nodes when called by one or more applications.

32. A method as described in claim 31, further comprising rendering the second media item referenced by the second node when the rendering of the first media item is completed.

33. A method as described in claim 31, further comprising:
rendering the second media item referenced by the second node;
receiving a call for a third node that references a third media item; and
creating the third node.

34. A method as described in claim 31, wherein at least one node is configured to reference an effect to be applied to an output of media referenced by the node.

35. A method as described in claim 31, wherein at least one node is specified as read-only.

36. A method as described in claim 31, wherein at least one node is configured for communication of events to another node such that a change may be made to the media timeline while the media timeline is rendered.

37. One or more computer storage devices storing computer executable instructions that, when executed by a computer, direct the computer to perform the method of claim 31.

38. A method as described in claim 31, wherein the plurality of node types further comprises:
   a root node that specifies a starting point for rendering the media timeline, the root node including metadata that describes how rendering is to be initiated;
   a leaf node that directly maps to media to be rendered and output, the leaf node including metadata that describes how to retrieve the media; and
   a parallel node type that includes metadata specifying a plurality of leaf nodes that are rendered simultaneously.

39. In a media timeline exposed via an application programming interface, the media timeline having a plurality of nodes, at least two of which reference respective media, one or more nodes each having metadata that references a node grouping, a method comprising:
   utilizing a computer to load a first node for rendering, wherein the first node is selected from a plurality of node types, the plurality of node types comprising a parallel node type that includes metadata specifying a plurality of leaf nodes that are rendered simultaneously;
   examining metadata associated with the first node to determine a first node grouping to be loaded in conjunction with the first node;
   loading each node referenced by the first node grouping;
   rendering the first node grouping;
   examining at least one second node in the first node grouping to determine a second node grouping, wherein the examining the at least one second node in the first node grouping is performed during the rendering of the first node grouping;
   loading each node referenced by the second node grouping; and
   rendering the second node grouping when the rendering of the first node grouping is completed, wherein:
      the media timeline is configured for dynamic creation, automatically by the one or more computers without human user interaction, where at least a third node is specified automatically by the computer without human user interaction for delayed creation while the media timeline is being rendered, the dynamic creation of the third node being performed by a node source that includes data that defines properties and interrelationships of the created third node with respect to one or more nodes in the first node grouping or one or more nodes in the second node grouping; and
      at least a fourth node is configured for communication of an initiated event to another a fifth node which has subscribed to receive events initiated by the fourth node, such that a change may be is made to one or more nodes in the media timeline that are affected by the initiated event while the media timeline is being rendered, wherein the plurality of one or more nodes of the media timeline that are affected by the initiated event change are automatically dynamically updated.

40. A method as described in claim 39, wherein at least one node is configured to reference an effect to be applied to an output of media referenced by the node, wherein the media comprises streaming media.

41. A method as described in claim 39, wherein at least one node is specified as read-only.

42. A method as described in claim 39, wherein a first node references media having a plurality of different formats that are a different format than media referenced by one or more nodes of the second node grouping.

43. One or more computer storage devices storing computer executable instructions that, when executed by a computer, direct the computer to perform the method of claim 39.

44. A method as described in claim 39, wherein the plurality of node types further comprises:
   a root node that specifies a starting point for rendering the media timeline, the root node including metadata that describes how rendering is to be initiated; and
   a sequence node type that includes metadata that describes a rendering order of a plurality of leaf nodes to the sequence node.

45. A method as described in claim 39, wherein the media timeline is configured for dynamic creation that occurs without user interaction.

46. A method comprising:
   exposing a media timeline via an application programming interface (API), the media timeline having a plurality of nodes, two or more nodes each referencing respective media at least one of which comprises streaming media, and wherein the media timeline is configured for dynamic creation, automatically by the one or more computers without human user interaction, such that metadata included in at least one node specifies a collection of nodes to be loaded when the media timeline is rendered;
   rendering a first node to output a referenced first said media;
   during the rendering of the first node, the API dynamically changing one or more properties of a second node;
   initiating, by an event generator located on the second node, an event for communication to a parent node of the second node, wherein the event describes the changing; and
   delaying, automatically by the one or more computers without human user interaction, creation of one or more of the plurality of nodes when the media timeline is exposed, wherein the delayed creation includes creating the one or more of the plurality of nodes when called by one or more applications.

47. A method as described in claim 46, wherein the event is communicated to at least one of an application over the API and a timeline source for rendering the media timeline.

48. A method as described in claim 46, wherein the one or more properties are selected from the group consisting of:
   node added event;
   node removed event;
   node changing event;
   remove children event;
   node source added event;
   node source removed event;
   node sort event; and
   node moved event.

49. A method as described in claim 46, wherein:
   at least one node of the media timeline is configured as a root node; and each event generated by one of the plurality of nodes that is a child of the root node is communicated to the root node.

50. A method as described in claim 46, wherein the media timeline is configured for dynamic creation such that at least one node is created while the media timeline is rendered.

51. A method as described in claim 46, wherein at least one node is specified as read-only.

52. A method as described in claim 46, wherein at least one node is configured to reference an effect to be applied to an output of media referenced by the node.

53. One or more computer storage devices storing computer executable instructions that, when executed by a computer, direct the computer to perform the method of claim 46.

54. A method as described in claim 46, wherein one or more nodes of the media timeline subscribes to events initiated by other nodes of the media timeline.

55. An application programming interface stored on a computer storage device, which when interfaced with a computer, exposes a media timeline to one or more independent applications, the application programming interface comprising:
the media timeline, automatically by the computer without human user interaction, delaying creation of one or more of a plurality of nodes when the media timeline is rendered, wherein the delayed creation includes the computer creating the one or more of the plurality of nodes when called by one or more applications;
the media timeline comprising the plurality of nodes callable by the one or more applications, wherein:
each node includes metadata that describes the node, the metadata comprising a source object property that specifies a source object which can resolve to a media source that provides the media referenced by the node;
the one or more of the plurality of nodes reference a corresponding media item comprising a streaming media item;
the plurality of nodes are arranged in a tree structure; and
the arrangement of the plurality of nodes, one to another, describes an order for rendering the plurality of nodes, wherein the media timeline is configured for dynamic creation, automatically by the computer without human user interaction, such that at least one node is created while the media timeline is rendered and at least one node is dynamically updated in response to the at least one node being created.

56. An application programming interface as described in claim 55, wherein the metadata for each node is selected from a group of metadata, the group of metadata comprising:
a uniform resource locator (URL) property for the media referenced by the node;
a source object identifier (ID) property that specifies a unique identifier of the source object;
a media start property that specifies a time, during a duration of the media referenced by the node, that rendering of the media is to be started;
a media stop property that specifies a time, during a duration of the media referenced by the node, that rendering of the media is to be stopped;
a time format property that specifies a time format for at least one of the media start property, and the media stop property;
a stream selection property which specifies one of a plurality of streams for rendering of the media referenced by the node;
a format based property that specifies a format for the media referenced by the node;
a loop count property that specifies a number of times the node is to be rendered;
a disabled property that specifies whether the node is to be rendered when the media timeline is rendered;
a noskip property that specifies that the rendering of the node is not to be skipped when the media timeline is rendered; and
a noskip child property that specifies that the node has another node, which is a child of the node, which specifies that the rendering of the other node is not to be skipped when the media timeline is rendered.

57. An application programming interface as described in claim 55, wherein at least one node is configured to reference an effect to be applied to an output of media referenced by the node.

58. An application programming interface as described in claim 55, wherein at least one node includes metadata that describes rendering of the at least one node.

59. An application programming interface as described in claim 55, wherein the media timeline is configured for dynamic loading such that metadata included in at least one node specifies a collection of nodes to be loaded when the media timeline is rendered.

60. An application programming interface as described in claim 55, wherein at least one node is specified as read-only.

61. An application programming interface as described in claim 55, wherein at least one node is configured for communication of events to another node such that a change may be made to the media timeline while the media timeline is rendered.

62. An application programming interface stored on a computer storage device, that when accessed by a computer facilitates acts comprising:
exposing, automatically by the computer without human user interaction, a media timeline to one or more independent applications, the media timeline comprising a plurality of nodes callable by one application, wherein:
two or more of the nodes reference respective media, one of which comprises streaming media;
at least one of the nodes specifies, automatically by the computer without human user interaction, delayed creation of one of the plurality of nodes as a delayed node when the media timeline is rendered, wherein the delayed creation includes creating the delayed node when called by one or more applications;
the plurality of nodes are arranged in a hierarchy to include a parent node and a child node; and
the child node is configured for initiating an event for communication to the parent node, wherein the event:
is configured such that a change may be made to one or more properties of the child node while the media timeline is rendered; and
describes the change such that additional nodes associated with the child node are dynamically created, automatically by the computer without human user interaction, in accordance with the communicated event.

63. An application programming interface as described in claim 62, wherein another node, which is not a parent of the child node, subscribes to the child node to receive the event.

64. An application programming interface as described in claim 62, wherein another node subscribes to the child node to receive:
the event initiated by the child node; and
one or more events initiated by children of the child node.

65. An application programming interface as described in claim 62, wherein the event describes a change made to the media timeline, the event selected from the group consisting of:
  node added event;
  node removed event;
  node changing event;
  node changed event;
  remove children event;
  node source added event;
  node source removed event;
  node sort event; and
  node moved event.

66. An application programming interface as described in claim 62, wherein:
  one node of the media timeline is configured as a root node; and
  each event generated by one of the plurality of nodes that is a child of the root node is communicated to the root node.

67. An application programming interface as described in claim 62, wherein the media timeline is configured for dynamic loading such that metadata included in at least one node specifies a collection of nodes to be loaded when the media timeline is rendered.

68. An application programming interface as described in claim 62, wherein at least one node is configured to reference an effect to be applied to an output of media referenced by the node.

69. An application programming interface as described in claim 62, wherein at least one node is specified as read-only.

70. An application programming interface stored on a memory of a computer that, when interacted with by an application facilitates actions comprising:
  exposing a media timeline comprising two or more nodes to the application; and
  enabling the application to call any of the two or more nodes, wherein each of the two or more nodes:
    references corresponding media, at least one of the corresponding media comprising streaming media while another of the corresponding media does not include streaming media;
    includes metadata describing one or more properties for rendering the corresponding media; and
    includes metadata specifying the node as read-only; and
  configuring, automatically by the computer without human user interaction, the media timeline for dynamic creation such that at least one of the two or more nodes is created while the media timeline is being rendered; and
  specifying, automatically by the computer without human user interaction, delayed creation of one of the two or more nodes as a delayed node when the media timeline is rendered, wherein the delayed creation includes creating the delayed node when called by one or more applications.

71. A system comprising:
  a plurality of media comprising streaming media;
  a plurality of applications; and
  an infrastructure layer that:
    provides an application programming interface (API) for interaction by the plurality of applications with the plurality of media when any application is executed; and
    exposes a media timeline, callable by the plurality of applications via the API upon an execution thereof, and that defines a presentation of the plurality of media, wherein the media timeline:
      includes a plurality of nodes that each reference respective media;
      is configured to specify, automatically by a computer without human user interaction, delayed creation such that at least one node is not created until called by one or more of the plurality of applications;
      is configured for dynamic creation, automatically by the computer without human user interaction, such that at least one node is created while the media timeline is rendered; and
      is configured for dynamic loading such that metadata included in the at least one node created specifies a collection of nodes to be loaded when the media timeline is rendered.

72. A system as described in claim 71, wherein the media timeline is configured to reference an effect for application to an output of one or more of the plurality of media.

73. A system as described in claim 71, wherein:
  the media timeline defines a presentation of a first media referenced by a first node with respect to a second media referenced by a second node; and
  at least one node includes metadata that describes rendering of the at least one node.

74. A system as described in claim 71, wherein at least one node is specified as read-only.

75. A system as described in claim 71, wherein at least one said node is configured for communication of events to another node such that a change may be made to the media timeline while the media timeline is rendered.

76. A computer comprising:
  a processor; and
  memory configured to maintain:
    a plurality of media;
    a plurality of applications, wherein each application is configured to request at least one of editing, encoding, and rendering of the plurality of media;
    an infrastructure layer configured to:
      provide an application programming interface (API) for interaction by the plurality of applications with the plurality of media; and
      expose a media timeline, callable by the plurality of applications via the API, which includes a plurality of nodes that define a presentation of the plurality of media, wherein the media timeline specifies:
        dynamic creation such that at least one of the plurality of nodes is created while the media timeline is being rendered automatically by the computer without human user interaction;
        delayed creation of one or more nodes when the media timeline is rendered, wherein the delayed creation comprises creating the one or more nodes, automatically by the computer without human user interaction, when called by one or more applications; and
        metadata that is utilized by the plurality of applications, wherein the metadata describes:
          initiating rendering of the plurality of nodes is to be initiated;
          properties and interrelationships of the plurality of nodes;
          node types of the plurality of nodes; and
          dynamic changes to the media timeline such that a group of nodes affected by a modification to an associated node are automatically updated in accordance with the modification as specified in the properties and interrelationships of the plurality of nodes;

at least one node that is configured for communication of events to another node such that a change may be made to the media timeline while the media timeline is being rendered; and at least one node that is a parallel node that provides simultaneous rendering of at least two child nodes the child nodes including respective metadata and having respective pointers to respective media.

77. A computer as described in claim 76, wherein the media timeline is configured for dynamic loading such that metadata included in at least one node specifies a collection of nodes to be loaded when the media timeline is rendered.

78. A computer as described in claim 76, wherein at least one node is configured to reference an effect to be applied to an output of media referenced by the node.

* * * * *

UNITED STATES PATENT AND TRADEMARK OFFICE
CERTIFICATE OF CORRECTION

PATENT NO.         : 7,934,159 B1                                               Page 1 of 1
APPLICATION NO.    : 10/782734
DATED              : April 26, 2011
INVENTOR(S)        : Shafiq Ur Rahman et al.

It is certified that error appears in the above-identified patent and that said Letters Patent is hereby corrected as shown below:

In column 15, line 64, below "repeated infinitely." insert -- Disabled 728 --.

Signed and Sealed this
Nineteenth Day of July, 2011

David J. Kappos
*Director of the United States Patent and Trademark Office*